(12) United States Patent
Ritchey

(10) Patent No.: US 9,605,904 B2
(45) Date of Patent: Mar. 28, 2017

(54) WATER CONDENSER

(71) Applicant: Freedom Water Company Ltd., Kelowna (CA)

(72) Inventor: Jonathan G. Ritchey, Vernon (CA)

(73) Assignee: Freedom Water Company Ltd., Kelowna (CA)

( * ) Notice: Subject to any disclaimer, the term of this patent is extended or adjusted under 35 U.S.C. 154(b) by 0 days.

(21) Appl. No.: 14/326,369

(22) Filed: Jul. 8, 2014

(65) Prior Publication Data

US 2016/0097595 A1 Apr. 7, 2016

Related U.S. Application Data

(63) Continuation of application No. 13/627,951, filed on Sep. 26, 2012, now abandoned, which is a
(Continued)

(51) Int. Cl.
*F28B 1/06* (2006.01)
*B01D 53/26* (2006.01)
(Continued)

(52) U.S. Cl.
CPC ............. *F28B 1/06* (2013.01); *B01D 53/265* (2013.01); *F25B 39/00* (2013.01); *F25B 39/02* (2013.01); *F25B 39/04* (2013.01); *F25B 49/00* (2013.01); *F25D 21/14* (2013.01); *F28B 9/08* (2013.01); *F28B 11/00* (2013.01); *F28D 7/0066* (2013.01);
(Continued)

(58) Field of Classification Search
CPC .... F28B 1/06; F28B 9/08; F28B 11/00; F25B 49/00; F25B 39/00; F25B 2500/18; F28D 7/0066; F28D 7/0091; F28F 9/0268; C02F 1/32
See application file for complete search history.

(56) References Cited

U.S. PATENT DOCUMENTS 4,572,766 A * 2/1986 Dimitriou .............. B01D 1/221
159/28.6
5,309,725 A * 5/1994 Cayce ................... F24F 3/1405
62/173
(Continued)

*Primary Examiner* — Emmanuel Duke
(74) *Attorney, Agent, or Firm* — Perkins Coie LLP

(57) ABSTRACT

A water condenser includes a fan which draws a primary airflow through an upstream refrigerant evaporator, through an air-to-air heat exchanger and in one embodiment also an air-to-water heat exchanger uses cold water collected as condensate from the evaporator, the airflow to the evaporator being pre-cooled by passing through the air-to-air heat exchanger and the air-to-water heat exchanger prior to entry into the evaporator wherein the airflow is further cooled to below its dew point so as to condense moisture onto the evaporator far gravity collection. The evaporator is cooled by a closed refrigerant circuit. The refrigerant condenser for the closed refrigerant circuit may employ the fan drawing the airflow through the evaporator or a separate fan, both of which drawing an auxiliary airflow separate from the airflow through the evaporator through a manifold whereby bath the auxiliary airflow and the airflow through the evaporator, or just the auxiliary airflow are guided through the condenser and corresponding fan.

31 Claims, 24 Drawing Sheets

Related U.S. Application Data continuation of application No. 11/996,950, filed as application No. PCT/CA2006/001285 on Jul. 31, 2006, now abandoned.

(60) Provisional application No. 60/853,303, filed on Jul. 29, 2005.

(51) Int. Cl.
| | | |
|---|---|---|
| *F25B 39/00* | (2006.01) | |
| *F28D 7/00* | (2006.01) | |
| *F28F 9/02* | (2006.01) | |
| *F25B 39/02* | (2006.01) | |
| *F25B 39/04* | (2006.01) | |
| *F25B 49/00* | (2006.01) | |
| *F25D 21/14* | (2006.01) | |
| *F28B 9/08* | (2006.01) | |
| *F28B 11/00* | (2006.01) | |
| *C02F 1/00* | (2006.01) | |
| *C02F 1/32* | (2006.01) | |

(52) U.S. Cl.
CPC .......... *F28D 7/0091* (2013.01); *F28F 9/0268* (2013.01); *C02F 1/001* (2013.01); *C02F 1/32* (2013.01); *F25B 2500/18* (2013.01); *Y02W 10/37* (2015.05)

(56) References Cited

U.S. PATENT DOCUMENTS

| | | | | |
|---|---|---|---|---|
| 5,400,607 | A * | 3/1995 | Cayce | F24F 3/1405 62/173 |
| 6,743,467 | B1 * | 6/2004 | Jones | C09D 5/1675 427/180 |
| 2002/0020185 | A1 * | 2/2002 | Carr | B60H 1/3202 62/310 |
| 2002/0164944 | A1 * | 11/2002 | Haglid | B25B 27/0035 454/228 |
| 2005/0000681 | A1 * | 1/2005 | Gagnon | F04D 25/166 165/66 |

* cited by examiner

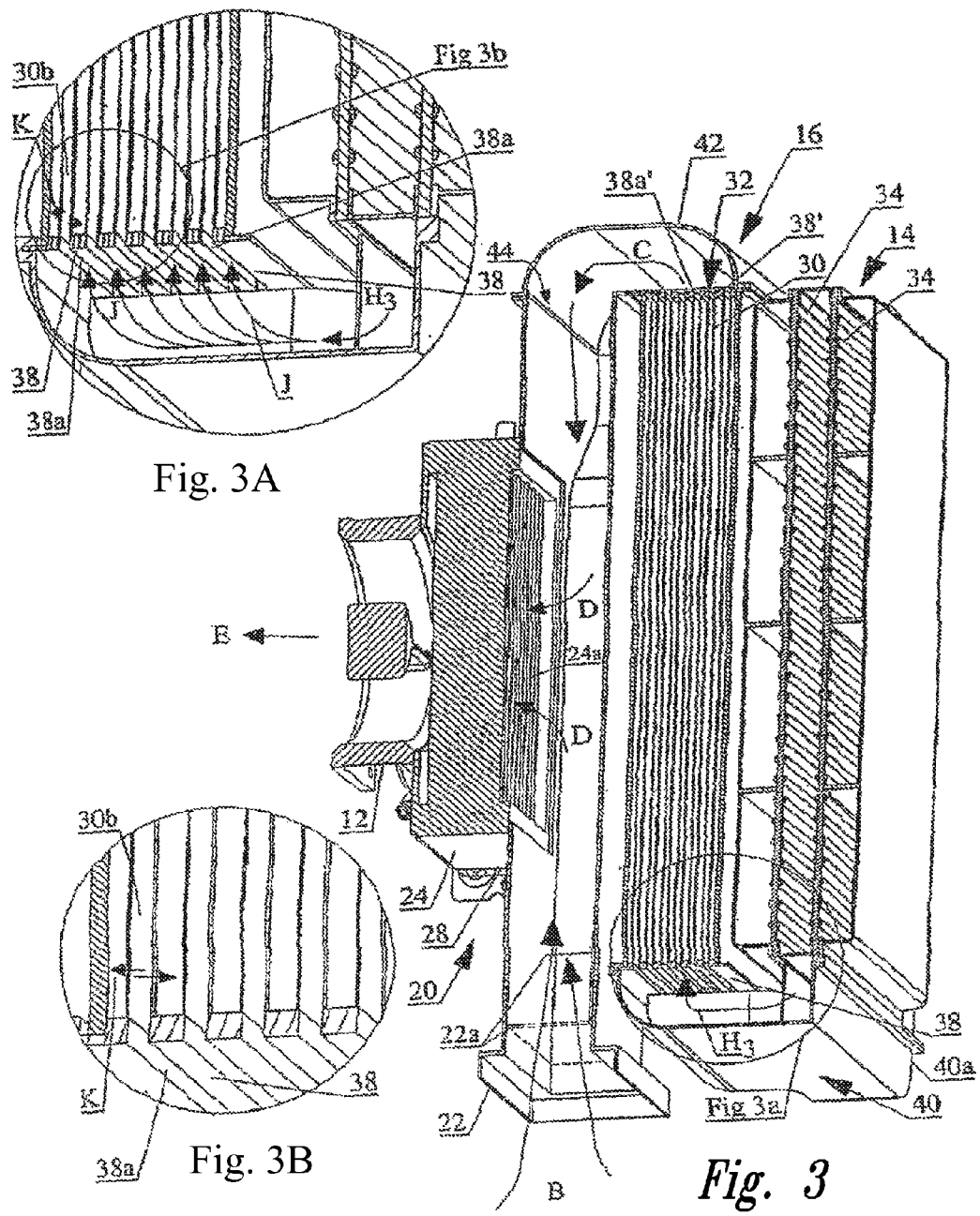

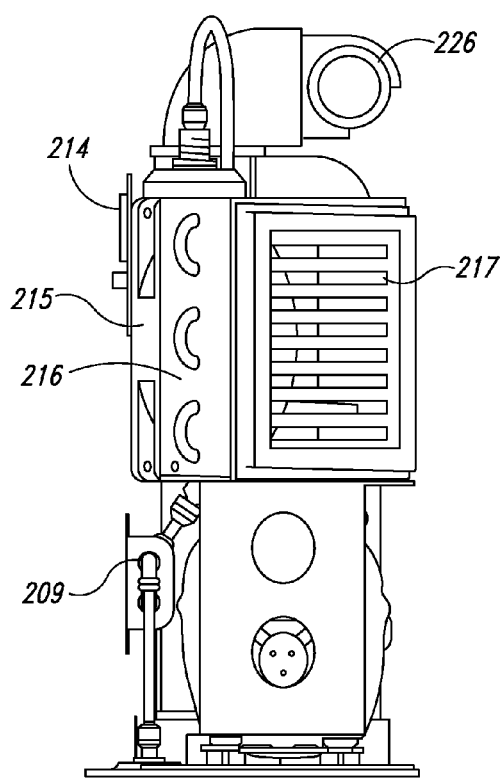
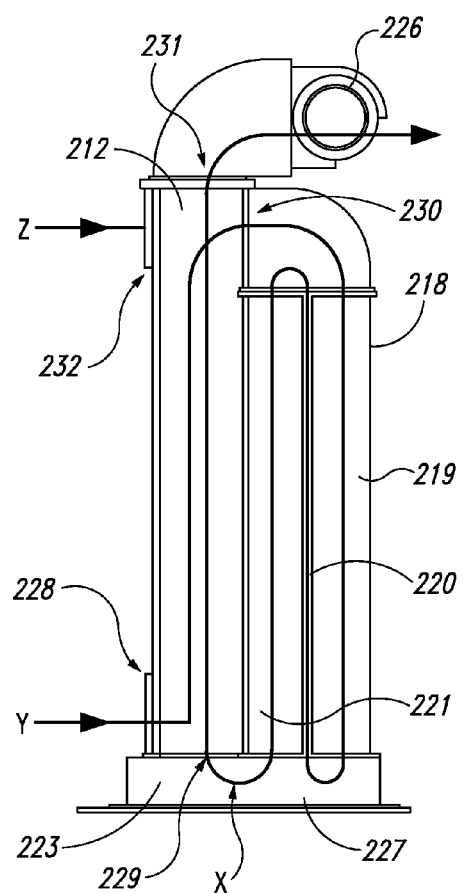
*Fig. 24*  *Fig. 25*

WATER CONDENSER

CROSS REFERENCE TO RELATED APPLICATIONS

The present application is a Continuation of U.S. patent application Ser. No. 13/627,951, filed Sep. 26, 2012, which is a Continuation of U.S. patent application Ser. No. 11/996,950, filed Aug. 20, 2008, which is a U.S. National Phase application of International Application No. PCT/CA2006/001285, filed Jul. 31, 2006, which claims the benefit of U.S. Provisional Application No. 60/853,303, filed Jul. 29, 2005, the disclosures of which are incorporated herein by reference in their entirety.

TECHNICAL FIELD

This invention relates to the field of water condensers generally and in particular to a water condenser providing for optimized controlled cooling of an ambient air flow to its dew point temperature so as to condense moisture from the ambient air to provide potable water.

BACKGROUND

At any given moment the earth's atmosphere contains 326 million cubic miles of water and of this, 97% is saltwater and only 3% is fresh water. Of the 3% that is fresh water, 70% is frozen in Antarctica and of the remaining 30% only 0.7% is found in liquid form. Atmospheric air contains 0.16% of this 0.7% or 4,000 cubic miles of water which is 8 times the amount of water found in all the rivers of the world. Of the remaining 0.7%, 0.16% is found in the atmosphere; 0.8% is found in soil moisture; 1.4% is found in lakes; and 97.5% is found in groundwater.

Nature maintains this ratio by accelerating or retarding the rates of evaporation and condensation, irrespective of the activities of man. Such evaporation and condensation is the means of regenerating wholesome water for all forms of life on earth.

In addition, many of the world's fresh water sources are contaminated. A total of 1.2 billion people in the world lack access to safe drinking water and 2.9 billion people do not have access to proper sanitation systems (World Health Organization). As a result, about 3.4 million people, mostly children, die each year from water-related illnesses. According to the United Nations, 31 countries in the world are currently facing water stress and over one billion people lack access to clean water. Half of humanity lacks basic sanitation services and water-borne pathogens kill 25 million people every year. Every 8 seconds, a child dies from drinking contaminated water. Furthermore, unless dramatic changes occur, soon, close to two-thirds of the world's population will be living with freshwater shortages.

There is a global need for cost effective and scalable sources of potable water. Current technologies require too much energy to operate efficiently and the resultant cost of the treated water puts these technologies out-of-reach for the majority in need. Desalination plants exist in rich nations such as the United States and Saudi Arabia but are not feasible everywhere. The lack of infrastructure in developing nations makes large plants with high-volume production impractical, as there is no way to transport the water efficiently.

There is a need for small scalable water extraction devices that meet the needs of individuals, communities and industries. This invention responds to that need by providing an extraction unit that functions "off-the-grid" to make clean pure water, anywhere where the need exists.

The present invention is a device that extracts moisture vapour from atmospheric air for use as a fresh water source. The device may utilize the sun as the primary energy source thereby eliminating the need for costly fuels, hydro or battery power sources. The water collection device of the present invention provides flexibility over prior devices, allowing for productive installations in most regions of the world. As the water collection device's preferred power source is solar energy, the amount of available power for the device increases as installations of the device are closer to the equator where there is more sunlight year round.

The invention is designed to allow one small water cooler sized unit to provide cooking and drinking water for a family, simply by harvesting the water vapour from humid air. Private individuals, industries and communities could control their own water supply through the use of the device's technology. It is also practical for many uses in domestic, commercial or military applications and offers ease of use and clean water of a highest quality anywhere, anytime. The modular design of these devices allow for increased capacity, simply by adding more modules.

In addition to domestic use, larger units based upon the same basic technology are appropriate for other applications in which larger water supplies are required. For example, a 12 Volt compressor in the cooling system within the device, may be replaced with a larger 110 Volt compressor with the appropriately sized other components such as the evaporator and the condenser, and the unit will be capable of condensing larger quantities of water as electrical power is more readily available.

The device's solar water powered condenser technology may be applied to a variety of uses from residential to recreational and from commercial and agricultural to military and life saving in extreme water deprived regions of the world.

This invention may be used for obtaining pure drinking water, for cooking purposes or for other household uses such as cleaning or bathing. The system may also be used on boats or in vacation areas, on camping trips, trekking, and places where drinking water delivery systems are not developed. The unit may be used to produce fresh water for bottling purposes or for large commercial applications such as restaurants, offices, schools, hotel lobbies, cruise ships, hospitals and other public buildings. The system may also be used in playing fields and sports arenas.

Additionally, the device may be used to augment the supply of water used to irrigate selected crops using micro or drip irrigation systems. These systems deliver the right amount of water at the right time, directly to the roots of plants. As well, the technology may be used to for bottled water production or virtually any other application where water is needed.

The proposed technology provides an opportunity to end much suffering. The death and misery that flow from unsafe water is overwhelming. More than 5,000 children die daily from diseases caused by consuming water and food contaminated with bacteria, according to a recent study released by UNICEF, the World Health Organization (WHO) and the UN Environment Program (UNEP).

Currently, 1.2 billion people have no access to safe drinking water and that number is increasing steadily, with forecasts of a potential 2.3 billion (or one-third of the earth's population) without access to safe water by 2025 (World Health Organization's statistics from World Commission on Water for the 21st Century). These at-risk children and their families are not restricted to rural areas in undeveloped nations. "Millions of poor urban dwellers have been left without water supply and sanitation in the rapidly growing cities of the developing world. The poor are often forced to pay exorbitant prices for untreated water, much of it deadly," reports William Cosgrove, director of World Water Vision, Paris. The device, according to the invention, can relieve much of this suffering.

A rapid increase in water demand, particularly for industrial and household use, is being driven by population growth and socioeconomic development. If this growth trend continues, consumption of water by the industrial sector will be double by 2025 (WMO). Urban population growth will increase the demand for household water, but poorly planned water and sanitation services will lead to a breakdown in services for hundreds of millions of people. Many households will remain unconnected to piped water.

The present invention offers a practical and affordable solution to many of the world's water supply problems.

It should be noted that while much of the prior art is based on simply extracting what can be extracted from the air using a simplistic and uncontrolled process, some water will be extracted, but with little concern for efficiency. This lack of efficiency can be explained by understanding the different types of heat that are used in the process of extracting water from air.

The heat that is used to bring air temperature down to the dew point is "specific heat". The heat used to bring the temperature of air below the dew point is "latent heat" and represents a dynamic variable in the condensation process. The optimal condensation process uses as little "latent heat" as is possible.

The dew point of air is the temperature at which the water vapour in the air becomes saturated and condensation begins.

For reference, specific heat means the amount of heat, measured in calories, required to raise the temperature of one gram of a substance by one Celsius degree.

Latent heat means: The quantity of beat absorbed or released by a substance undergoing a change of state, such as ice changing to water or water to steam, at constant temperature and pressure. This is also called heat of transformation.

In the optimal condensation process if too much air is drawn through the system, the system cannot transfer enough of the total volume of air to a temperature below the dew point, therefore resulting in poor performance from the system.

If not enough air is drawn through the device the air temperature will drop below the dew point but as there is less air moving through the system, there is respectively less water available to be drawn from that air. As well, other issues that arise when too little air is moved through the system such as freezing and wasted energy in the overuse of "latent" beat. Therefore there is an optimal quantity of air that travels through the system based upon a number of variables and that optimal quantity of air will change as the other variables change. It is therefore necessary to have a system that is monitored and reacts to the changes in temperature and humidity so as to ensure ongoing optimal operation.

SUMMARY

The water condenser according to the present invention is a device that may use various input source energy supplies to create a condensation process that extracts potable water from atmospheric air.

In one embodiment the water condenser is portable and the refrigeration cycle may be driven by a 12 Volt compressor that allows for an efficient condensation process for creating a potable water supply. The input source energy for the compressor may be supplied from many sources such as a wind turbine, batteries, or a photovoltaic panel. Additionally the design may be fitted with transformers to accommodate other power supplies such as 110 Volt or 220 Volt systems when such electrical power is available, or the device may be sized or scaled up so as to accommodate such electrical power sources directly. For example, the device might use a 110 Volt compressor and simply have the device's other components scaled-up to accommodate the larger compressor.

Rather than filtering water with conventional systems such as reverse osmosis or carbon filtration, the device filters the atmospheric air then provides a condensation process that lowers the temperature of that air to below dew point of the air flow. The air is then exposed to an adequate sized, cooled surface area upon which to condense, and the water is harvested as gravity pulls the water into a storage compartment.

The disclosed invention creates a high quality water supply through a process of filtering air rather than water. The device may be fitted with a screen to keep out larger contaminates. Downstream of the screen may be a pre-filter. The pre-filter may be removable for cleaning. Downstream of the pre-filter may be a high quality filter such as a HEPA filter to ensure the air flow is pure and depleted of contaminates that might lower the quality of water that is created by the condensation process downstream of the air filtration. Rather than using a capillary tube metering mechanism for feeding refrigerant fluid into the refrigerant evaporator, such as is normally used for smaller refrigeration systems, the device according to the present invention, may be fitted with an automatic suction valve so as to allow for the device to adapt to varying loads created by different environments. One object is that the condensation process is to provide efficient processing of atmospheric, that is ambient air. Thus the intake air flow downstream of the air filtration may be pre-cooled, prior to entering a refrigerant evaporator used to condense moisture out of the intake air flow, by passing the intake air flow through an air-to-air beat exchanger, itself cooled by cooled air leaving the evaporator. That is, the incoming air flow is cooled before it enters the refrigerant evaporator section by passing it in close proximity in the heat exchanger to the cooled air that is leaving the refrigerant evaporator. Air-to-air heat exchangers may be constructed to be very efficient, reaching 80% efficiency, and therefore reducing the temperature of the incoming air flow towards the dew point prior to the air flow entering the refrigerant evaporator, reduces the temperature differential, or temperature drop that must obtained by passing the air over cooled surfaces in the refrigerant evaporator to obtain the dew point temperature, and thus may have a significant impact upon the efficiency of the condensation process and thus the efficiency of the device. For example the device may thus be optimized to increase the air flow rate and still be able to reduce the air flow temperature to the dew point, or the device will be able to handle very hot inflow temperatures and still reduce the dew point temperature of a reasonable air flow volume over time so as to harvest a useful amount of moisture. Sensors provide temperature, for example ambient, inlet temperatures, refrigerant evaporator inlet and refrigerant evaporator outlet temperatures, humidity, and fan speed or other air flow rate indicators to the process to optimize and balance those variables to maximize harvested moisture volume. Embodiments of the present invention may thus include varying the flow of air through the system such that the device has a prescribed amount of air passing through the refrigerant evaporator and a different flow of air passing through the refrigerant condenser of the corresponding refrigerant circuit, allowing for optimized function.

In addition to the benefits described above, the water condenser may add additional value in further processing. For example, the harvested water may be further processed so as to increase the value of the water, by adding back inorganic minerals missing or only present in small amounts in the water, so as to accommodate the perceived value of these minerals to the consumer. This process may also add organic minerals back into the water which are of benefit to the human body, rather than simply adding back inorganic minerals that the human body may not be able to properly assimilate.

There are numerous means by which to put back minerals and trace elements into the harvested water. For example, a small compartment with a hinged door, allowing it to be easily accessed, may be provided between a drip plate at the bottom of the refrigerant evaporator and a downstream water storage container, so as to have all harvested water pass through this chamber. A provided mineral puck may inserted into this chamber by a user so that harvested water drips over the mineral puck, causing the puck to dissolve and thereby adding desired elements to the harvested water. The user thereby controls re-mineralization of the harvested water. Additional health remedies may also be added to the harvested water such as colloidal silver, water oxygenation additives, negatively ionized hydrogen ions or other health enhancing products.

In summary, the water condenser, according to the present invention, may be characterized in one aspect as including at least two cooling stages, or first cooling a primary or first air flow flowing through the upstream or first stage of the two stages using an air-to-air heat exchanger, and feeding the primary air flow, once cooled in the heat exchanger, of one first stage in a refrigerant evaporator wherein the primary air flow is further cooled in the refrigerant evaporator to its dew point so as to condense moisture in the primary air flow onto cooled surfaces of the refrigerant evaporator, whereupon the primary air flow, upon exiting the refrigerant evaporator of the second stage, enters the air-to-air heat exchanger of the first stage to cool the incoming primary air flow, thereby reducing the temperature differential between the temperature of the incoming primary air flow entering the first stage and the dew point temperature of the primary air flow in the second stage. A secondary or auxiliary air flow, which in one embodiment may be mixed or joined (collectively referred to herein as being mixed) with the primary air flow, downstream of the first and second stages so as to increase the volume of air flow entering a refrigerant condenser in the refrigerant circuit corresponding to the refrigerant evaporator of the second stage. Thus if the primary or first air flow has a corresponding first mass flow rate, and the secondary or auxiliary air flow has a corresponding second mass flow rate, then the mass flow rate of the combined air flow entering the refrigerant condenser is the sum of the first and second mass flow rates, that is greater than the first mass flow rate in the two cooling stages. The two cooling stages may be contained in one or separate housings as long as the primary air flow is in fluid communication between the two stages. One housing includes a first air intake for entry of the primary air flow. The first air intake is mounted to the air-to-air heat exchanger.

The air-to-air heat exchanger has a pre-refrigeration set of air conduits cooperating at their upstream end in fluid communication with the first air intake. The first air intake thus provides for intake of the primary air flow into the pre-refrigeration set of air conduits. The air-to-air heat exchanger also has a post-refrigeration set of conduits arranged relative to the pre-refrigeration set of air conduits for heat transfer between the pre-refrigeration set of air conduits and the post-refrigeration set of air conduits.

A first refrigeration or cooling unit (hereinafter collectively a refrigeration unit) such as the refrigerant evaporator cooperates with the pre-refrigeration set of air conduits for passage of the primary air flow from a downstream end of the pre-refrigeration set of conduits into an upstream end of the first refrigeration unit. The first refrigeration unit includes first refrigerated or cooled (herein collectively or alternatively referred to as refrigerated) surfaces, for example one or more cooled plates, over which the primary air flow passes as it flows from the upstream end of the first refrigeration unit to the downstream end of the first refrigeration unit.

The already pre-cooled primary air flow is further cooled in the first refrigeration unit below a dew point of the primary air flow so as to commence condensation of moisture in the primary air flow onto the refrigerated surfaces for gravity-assisted collection of the moisture into a moisture collector, for example a drip late or pan mounted under or in a lower part of the housing. The downstream end of the first refrigeration unit cooperates with, for passage of the primary air flow into, an upstream end of the post-refrigeration set of air conduits, for example to then enter the air-to-air heat exchanger so as to pre-cool the primary air flow before the primary air flow engages the first refrigeration unit. Because of pre-cooling by the heat exchanger, condensate may be collected with minimal power requirements. A second air-to-air heat exchanger may further increase system performance. Collectively the pre-refrigeration and post-refrigeration sets of air conduits form the first cooling stage, and collectively the plate or plates of the refrigerant evaporator form the second cooling stage. An air-to-water heat exchanger may be provided cooperating with the air-to-air heat exchanger for cooling the primary air flow wherein the primary air flow is passed through the air-to-water heat exchanger and the cold moisture from the moisture collector is simultaneously passed through the air-to-water heat exchanger so that the moisture cools the first air flow. The air-to-water heat exchanger may be either upstream or downstream of the air-to-air heat exchanger along the primary air flow.

In one embodiment a manifold or air plenum having opposite upstream and downstream ends cooperates in fluid communication with the downstream end of the post-refrigeration set of conduits. That is, the upstream end of the air plenum cooperates with the downstream end of the post-refrigeration set of conduits so that the primary air flow flows into the air plenum at the upstream end of the plenum. The plenum has a secondary or auxiliary air intake into the plenum for mixing of the auxiliary air flow with, or addition of the auxiliary air flow in parallel to, the primary air flow in the plenum so as to provide the combined mass flow rate into the refrigerant condenser, to extract heat from the refrigerant in the refrigerant circuit to re-condense the refrigerant for delivery under pressure to the refrigerant evaporator in the second cooling stage, the refrigerant pressurized between the refrigerant evaporator and condenser by a refrigerant compressor (herein referred to as the compressor). Thus the downstream end of the plenum cooperates in fluid communication with the refrigerant condenser. An air flow primer mover such as a fan or blower (herein collectively a fan) urges the primary air flow through the two cooling stages. In embodiments wherein both the primary and auxiliary air flows are directed into the refrigerant condenser (herein also referred to as the combined air flow embodiment), a single air flow prime mover, such as a fan on the refrigerant condenser may be employed, otherwise, where only the auxiliary air flow flows through the refrigerant condenser, separate air flow prime movers are provided for the primary and auxiliary air flows.

In the combined air flow embodiment, a selectively actuable air flow metering valve, such as a selectively actuable damper, may be mounted in cooperation with the auxiliary air intake for selectively controlling the volume and flow rate of the auxiliary air flow passing into the plenum. An automated actuator may cooperate with the metering valve for automated actuation of the metering valve between open and closed positions of the valve according to at least one environmental condition indicative of at least moisture content in the primary and/or auxiliary air flows (herein "and/or" collectively referred to by the Boolean operator "or"). As an example, the automated actuator may be a temperature sensitive bi-metal actuator or an actuator controlled by a programmable logic controller (PLC); for example the automated actuator may include a processor cooperating with at least one sensor, the at least one sensor for sensing the at least one environmental condition and communicating environmental data corresponding to the at least one environmental condition from the at least one sensor to the processor or PLC. The at least one environmental condition may be chosen from the group consisting of air temperature, humidity, barometric air pressure, air density, or air mass flow rate. The air temperature conditioner may include the temperature of the ambient air at the primary air flow intake, and the temperature of the primary air flows entering and leaving the second cooling stage.

The processor regulates the first and/or second air flows, for example regulates the amount of cooling in the refrigeration unit, so that the air temperature in the first refrigeration unit is at or below the dew point of the primary air flow, but above freezing. The processor may calculate the dew point for the primary air flow based on the at least one environmental condition sensed by the at least one sensor.

The air flow prime mover may be selectively controllable and the processor may regulate the primary, auxiliary or combined air flow so as to minimize the air temperature of the primary air flow from dropping too far below the dew point for the primary air flow to minimize condensation within the heat exchanger, and so as to optimize or maximize the volume of moisture condensation in the refrigeration unit.

At least one filter may be mounted in cooperation with the water condenser housing. For example, at least one air filter such as a HEPA filter may be mounted in the flow path of the first air flow. A water filter may be provided for filtering water in the moisture collector. The air filters may include an ultra-violet radiation lamp mounted in proximity to, so as to cooperate with, the primary air flow path or the moisture collector. For example the air filter and the water filter may include a common ultra-violet radiation lamp mounted in proximity to so as to cooperate with both the primary air flow path and the moisture collector.

In upstream-to-downstream order, the first refrigeration unit may be adjacent the heat exchanger, the heat exchanger may be adjacent the plenum, the plenum may be adjacent the refrigerant condenser, and the refrigerant condenser may be adjacent the air flow prime mover. These elements may be inter-leaved in closely adjacent array.

BRIEF DESCRIPTION OF THE DRAWINGS

FIG. 3 is a sectional view along line 3-3 in FIG. 1.

FIG. 3A is an enlarged view of a portion of FIG. 3.

FIG. 3B is an enlarged view of a portion of FIG. 3A.

FIG. 24 is a side view of the embodiment shown in FIG. 17.

FIG. 25 is a partial cutaway side view of the embodiment shown in FIG. 17 showing the air flow.

DETAILED DESCRIPTION

Figure 1:
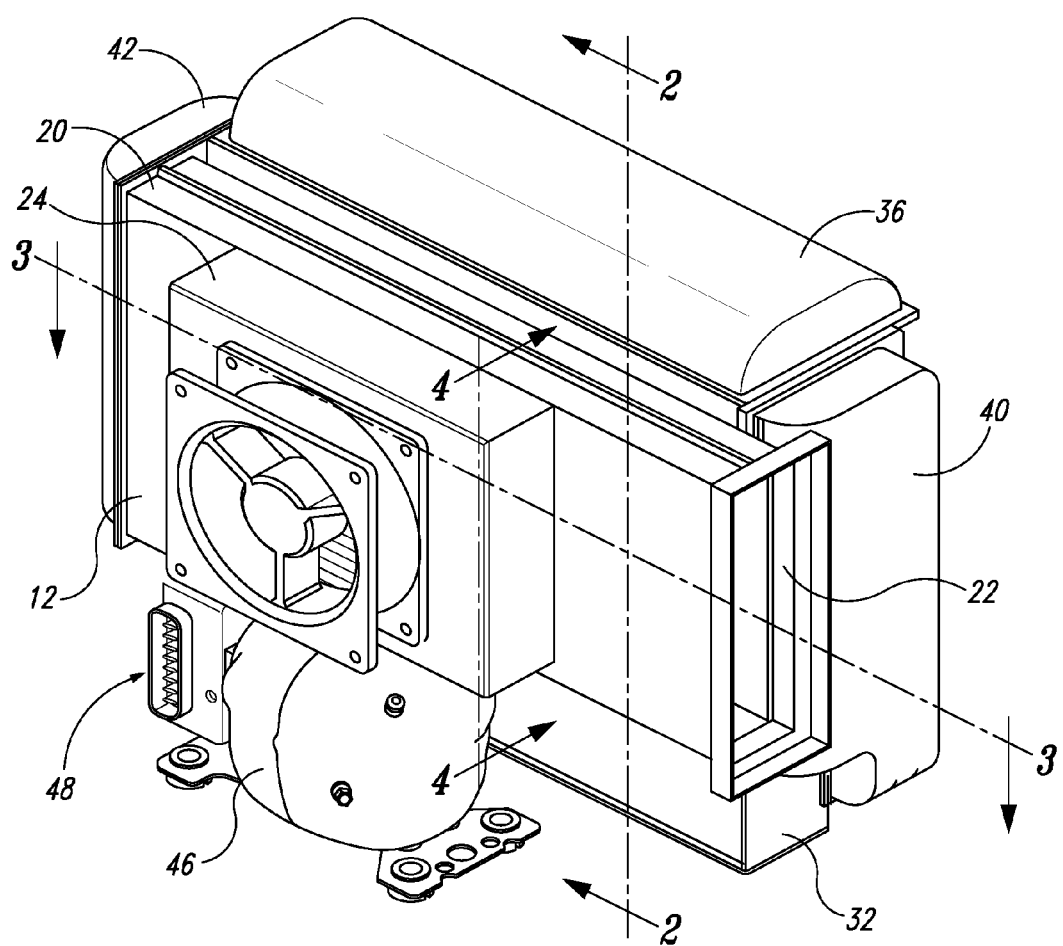
FIG. 1 is, in perspective view, one embodiment of the water condenser according to the present invention.

With reference to the drawings wherein similar characters of reference denote corresponding parts in each view, in one preferred embodiment of the present invention, a fan 12 draws a primary air flow along an upstream flow path A through an upstream refrigerant evaporator 14, through an air-to-air heat exchanger 16, and in an alternative embodiment also through an air-to-water heat exchanger using cold water collected as condensate from evaporator 14 (better described below), cooperating with an air intake 18 of upstream flow path A, then through a manifold 20 where ambient air is drawn in as auxiliary air flow in direction B through auxiliary air intake 22. The primary air flow enters manifold 20 in direction C upon leaving heat exchanger 16. The primary and auxiliary air flows, in the embodiment of FIG. 3, mix in manifold 20 then flow in direction D through a downstream refrigerant condenser 24 and finally flow through fan 12 so as to be exhausted and heated exhaust in direction E.

The primary air flow is pre-cooled in the air-to-air heat exchanger, and also in the air-to-water heat exchanger in the alternative embodiment. Humidity in the ambient air drawn in as the primary air flow through intake 18 is condensed in refrigerant evaporator 14. Water droplets which condense are gravity fed in direction F into a collection plate, pan or trough 26 for outflow through spout 26a. The addition of ambient air drawn in as the auxiliary air flow in direction B into manifold 20 provides the higher volumetric air flow rate needed to efficiently operate refrigerant condenser 24.

Figure 12:
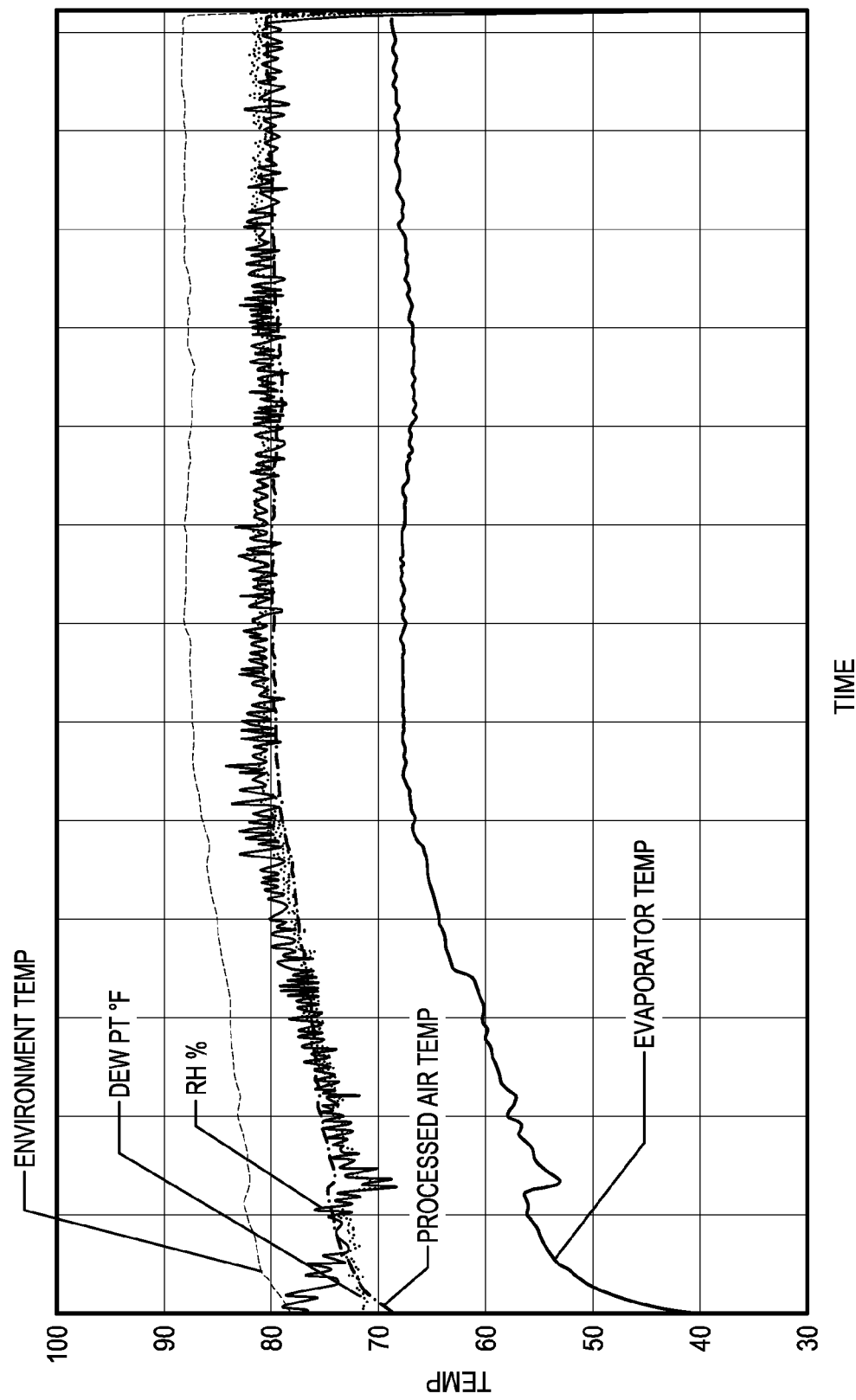
FIG. 12 is a graph of Temperature vs. Time showing the interrelation of Evaporator Temperature, Processed Air Temperature, Relative Humidity (RH) %, Dew Point Temperature, and Environmental Temperature in the device of FIG. 1.

In operation, the primary air flow is drawn in through the upstream air intake 18 of evaporator 14 in direction A and passes between the hollow air-to-air heat exchanger plates 30. Depending on the embodiment of the present invention, an air-to-water heat exchanger 90 may cooperate with air-to-air heat exchanger 16 and there may be one, two, three or more plates 30 in heat exchanger 16. Plates 30 are preferably parallel and are spaced apart to form flow channels therebetween, and between the outermost plates 30a and the walls 32a of the housing 32 of the heat exchanger. Within evaporator 14, plates 34 are refrigerated by the evaporation of refrigerant flowing into cooling coils 34a. Plates 34 are optimally cooled to a temperature which will cool the primary air flow to just below its dew point such as seen plotted from experimental data in FIG. 12 so as to condense water vapour in the primary air flow onto the surfaces of the plates and coils without causing the water vapour to form ice. For example, the primary air flow exiting evaporator 14 in direction H, so as to enter heat exchanger 16, may be cooled to 40. degree. Fahrenheit.

Once the primary air flow has passed between plates 30, and between outermost plates 30a and the walls 32a of housing 32 (collectively, genetically the pre-refrigeration set of air conduits), the primary air flow is turned one hundred eighty degrees in direction I by and within an end cap manifold 36 which extends the length of the upper ends of plates 30.

Figure 2:
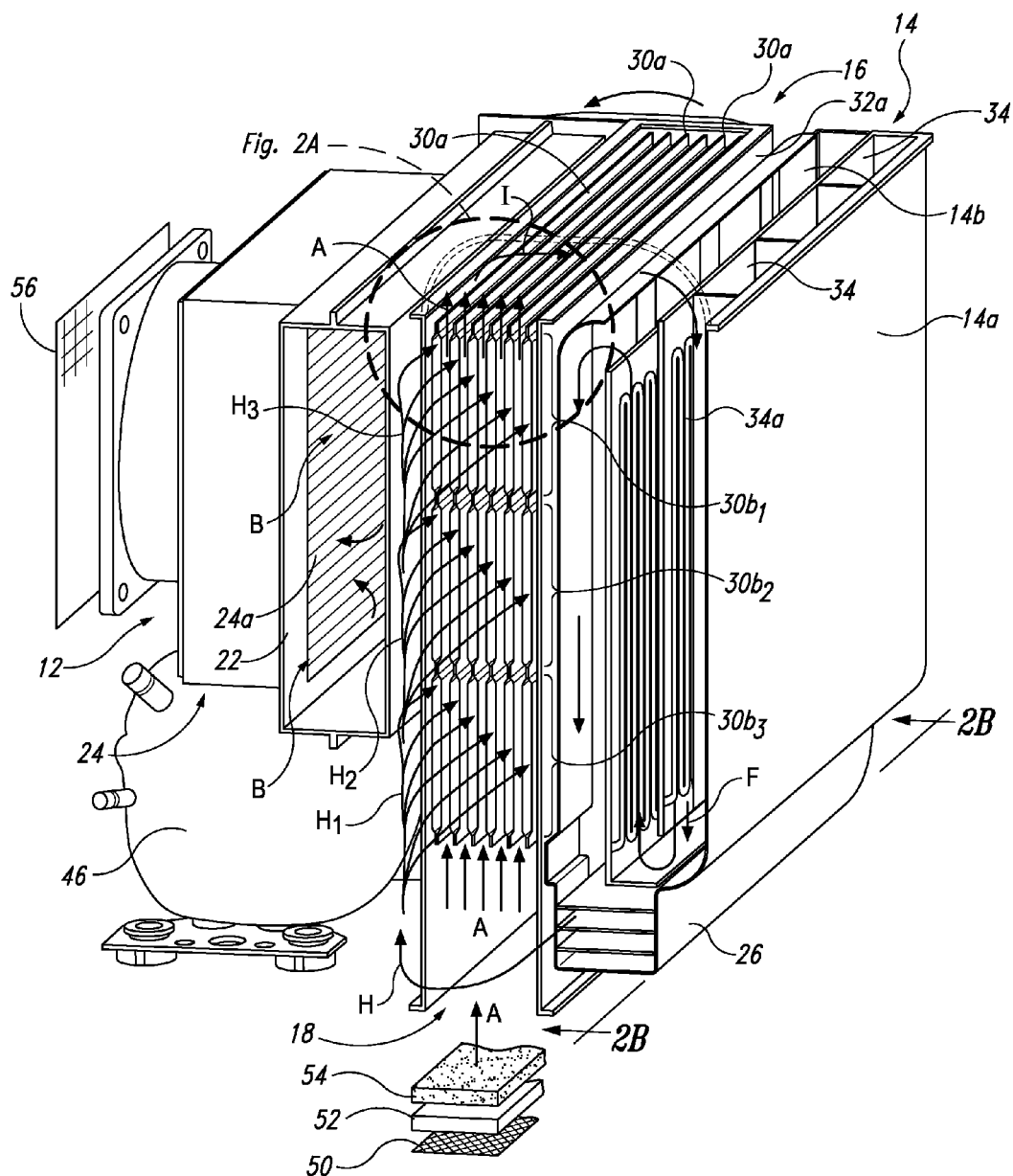
FIG. 2 is a sectional view along line 2-2 in FIG. 1.
Figure 2A:
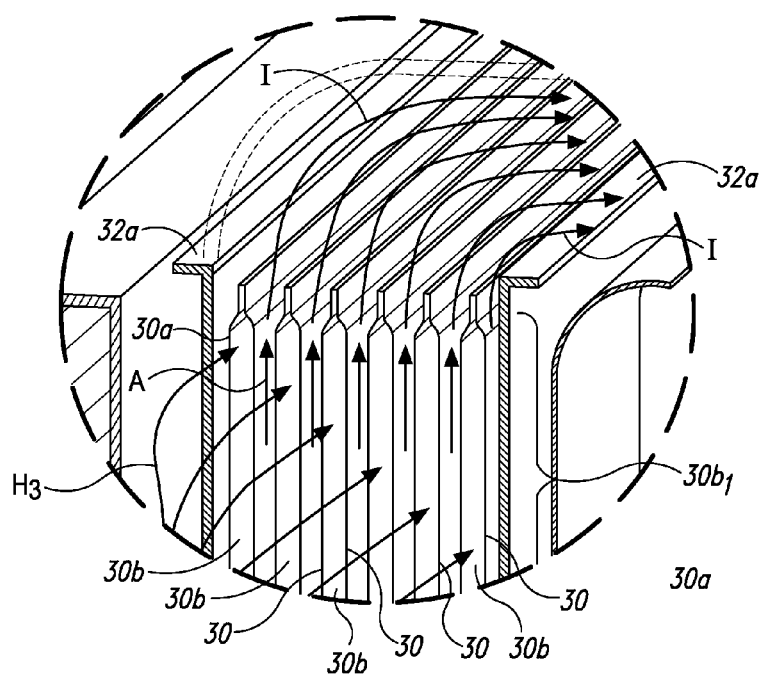
FIG. 2A is an enlarged view of a portion of FIG. 2.
Figure 2B:
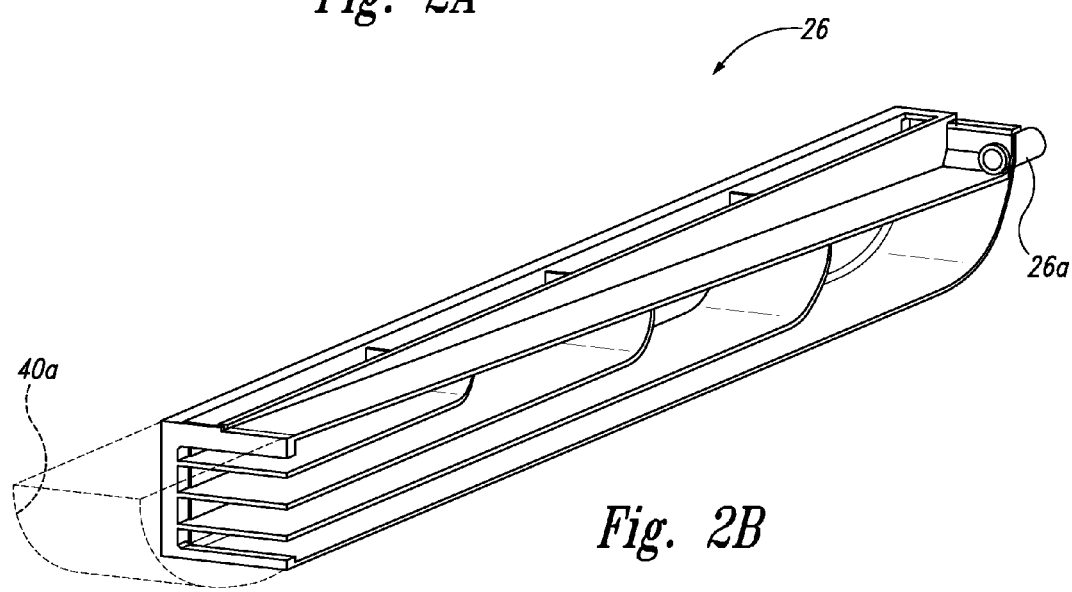
FIG. 2B is a sectional view along line 2b-2b in FIG. 2.
Figure 3C:
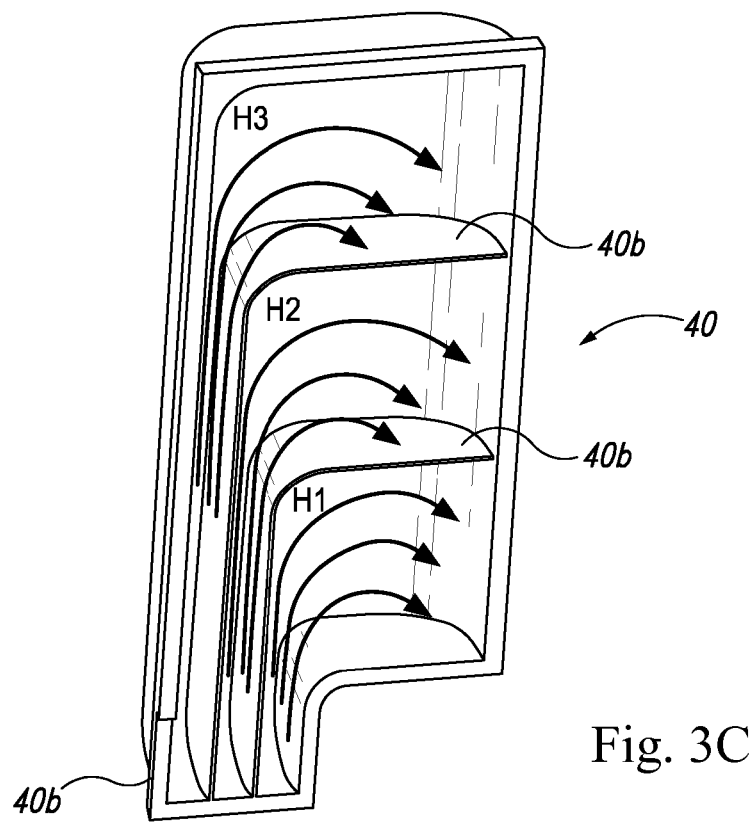
FIG. 3C is, in perspective view, the internal air conduits of the upstream side of manifold of the water condenser of FIG. 1.

Plates 30 themselves are rigidly supported in parallel spaced apart array sandwiched by and between planar end plates 38. The end plates have an array of apertures 38a therethrough. The apertures align with the open ends of sealed conduits 30b through the plates, as best seen in FIGS. 3, 3A and 3B, so that, once the air flow has turned one hundred eighty degrees in direction H through upstream side manifold 40, the air flow then passes in direction J through apertures 38a and along the length, of conduits 30b (the post-refrigeration set of air conduits) so as to exit from the corresponding apertures 38a downstream in the opposite end plate 38'. In particular, side manifold 40 in the illustrated embodiment of FIG. 3C, which is not intended to be limiting, segregates air flow in direction H into three flows HI, H2 and H3 so as to enter into corresponding conduits 30b, themselves arranged in three banks 30b], 3O2 and 3Ob3 arranged vertically one on top of the other as seen in FIG. 2. Fences 40b divide air flows HI, H2 and H3 from one another and align the air flows with their corresponding bank of sealed conduits 30b, so that air flows HI, H2 and H3 are aligned for flow into, respectively, conduit banks 3Ob1, 3Ob2 and 3Ob3. Fences 40b also align with plates 34 so as to partially segregate the infeed to air flows HI, H2 and H3 to come from, respectively, between the outside plate 34 and the outside wall 14a, between the inside and outside plates 34, and between the inside plate 34 and the inside wall 14b. A lower cap 40a seals the end of pan 26 and channels moisture collected from side manifold 40 into pan 26, as seen in FIG. 2B. Air-to-air heat transfer in direction K occurs through the solid walls of plates 30 so that the primary air flow in conduits 30b cools the primary air flow between the plates.

Figure 4:
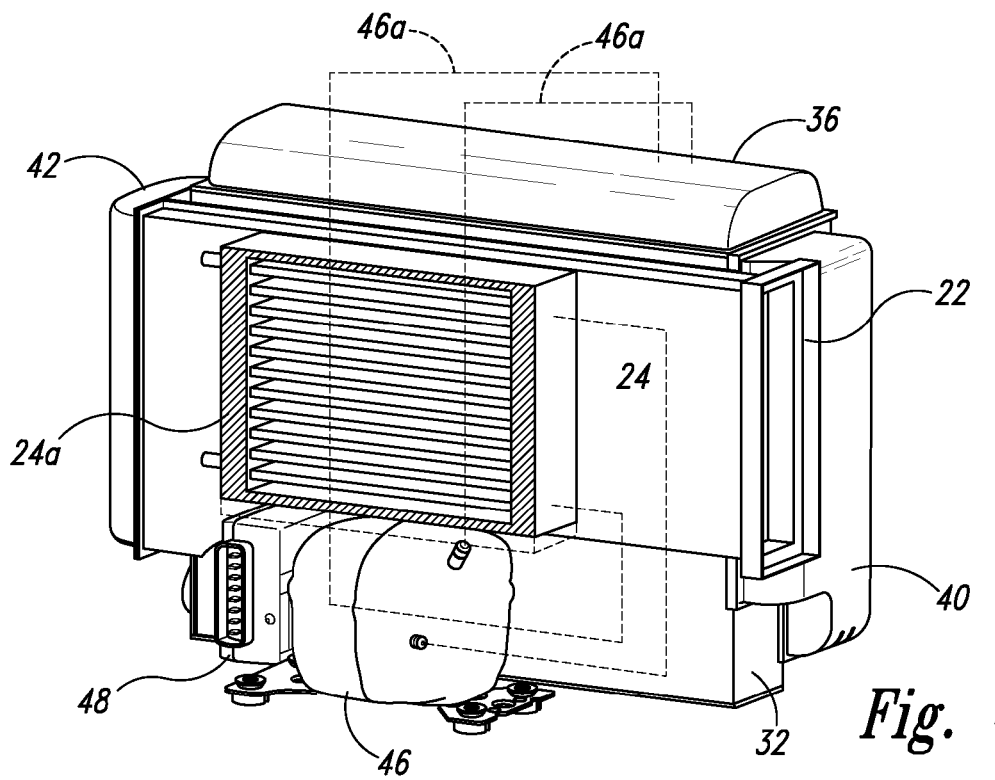
FIG. 4 is a sectional view along line 4-4 in FIG. 1.

Upon leaving the apertures 38a' in end plates 38, the air flow is again turned approximately one hundred eighty degrees in direction C by and within downstream side manifold 42 which extends the height of end plate 38'. Side manifold 42 directs air flow into manifold 20 through a port 44 leading into the upstream end of manifold 20. An ambient air intake 22 feeds ambient air in direction B into manifold 20 so as to, in one combined air flow embodiment, mix with the air flow from heat exchanger 16 with ambient air from auxiliary air intake 22. The flow rate of the auxiliary air flow through intake 22 is selectively regulated by actuation of damper 22a (shown in FIG. 3 in its closed position in dotted outline and in its open position in solid outline). The mixed air flow is then drawn in direction D into refrigerant condenser 24 so as to pass between the louvers 24a or coils or the like. Condenser 24 condenses refrigerant flowing in lines 46a (illustrated diagrammatically in dotted outline in FIG. 4) once compressed by compressor 46. The combined air flow then enters the in-line fan 12 and exhausts from the fan in direction E.

Atmospheric air enters intake 18 in direction A through screen 50, passing through pre-filter 52, then through a high quality filter, such as HEPA filter 54. Air flow leaving condenser 24 may pass through another filter 56. Filter 56 inhibits contaminates from entering the fan and thus keeps contaminates from getting into evaporator 14. Once the primary air flow has been processed through the two cooling stages of, respectively, heat exchanger 16 and refrigerant evaporator 14, the primary air flow may not be sufficiently cool to assist in the refrigerant coo ling in refrigerant condenser 24. Thus the primary air flow may be exhausted entirely from the system without flowing through condenser 24 without significantly affecting performance, or if the primary air flow is somewhat cool, it may be used to assist in cooling condenser 24. If the air that has passed through the evaporator 14 and heat exchanger 16 is exhausted upstream of condenser 24, the condenser 24 will draw its own air stream, which is the auxiliary air flow, directly from the ambient air outside the system. The use of the two air streams, primary and auxiliary has advantages in allowing a significant increase in air flow through the condenser versus the evaporator.

A controller 48, as described later, may do multiple tasks and the system may require multiple controllers if it is not beneficial or practical to build them all into the same unit. The controller 48 may be designed to accommodate a varying power input such as would be the case if the unit was hooked up directly to a photovoltaic panel. Controller 48 may also ensure that the refrigeration system pressures are maintained.

There are two pressures involved in a refrigeration system such as is employed in this design. These are the suction pressure (low side) and the discharge pressure (high side). For optimal performance the low side or suction pressure may be approximately 30 psi. The high side or discharge pressure is much harder to control and may be within the 120 psi to 200 psi range for optimal performance. With a normal refrigeration system the high side pressure is easier to control using conventional refrigeration controls, and poses little concern. With a system such as this, that is under constant changing load with large fluctuations in both temperature and humidity, the pressures are prone to change and can quickly move outside of the optimal range. This can cause damage to the system, as if the discharge pressure gets to high (over 250 psi) it may be very hard on the system and can cause internal damage to the valves in the compressor, the insulation on the electrical wiring, and may even cause the formation of waxes, as well as decreasing the overall efficiency of the system. These pressures may be controlled to some degree by controlling the pressures within the system and through controlling the flow of refrigerant. The high side or discharge may be controlled by regulating the quantity and temperature of the air that passes through the condenser. If the discharge pressure is too low (below 120 psi) the cooling system becomes compromised and functions below its capability. In this case the controller is designed to turn the fan off and allow the pressure to rise. If the pressure gets too high the controller will turn the fan on and the pressure will drop. This is a simple and inexpensive way to control the system discharge pressure.

Controller 48 may also find the optimal air flow rate through the condenser so as to moderate the discharge (also called backpressure) to an acceptable range (150 psi may be optimal). In this design the fan is kept at the optimal speed rather than turning off and on, so as to ensure proper system pressures and optimal operation of the refrigeration system.

Control System

Figure 13:
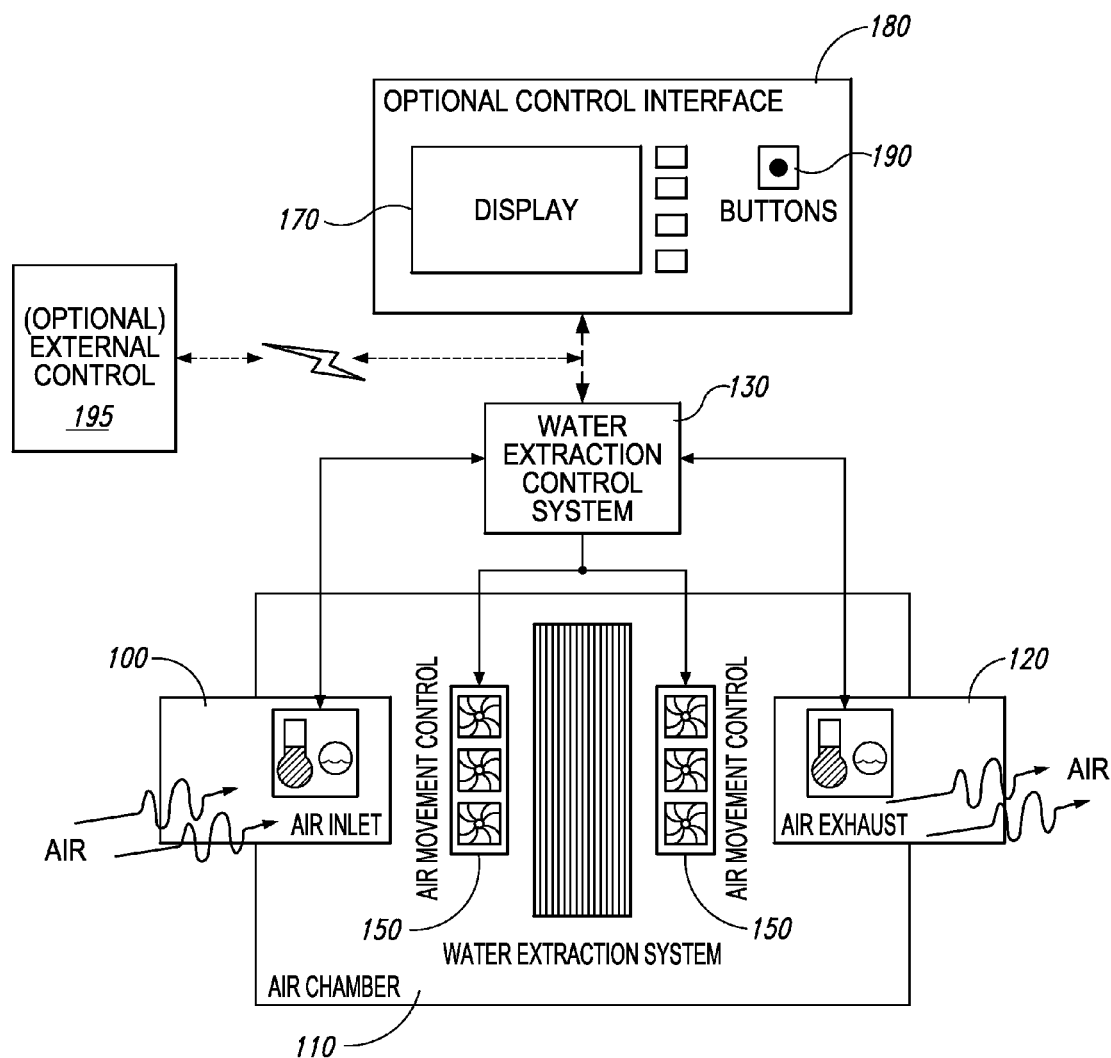
FIG. 13 is a block diagram showing an embodiment of control system for a water condenser according to the invention.
Figure 14:
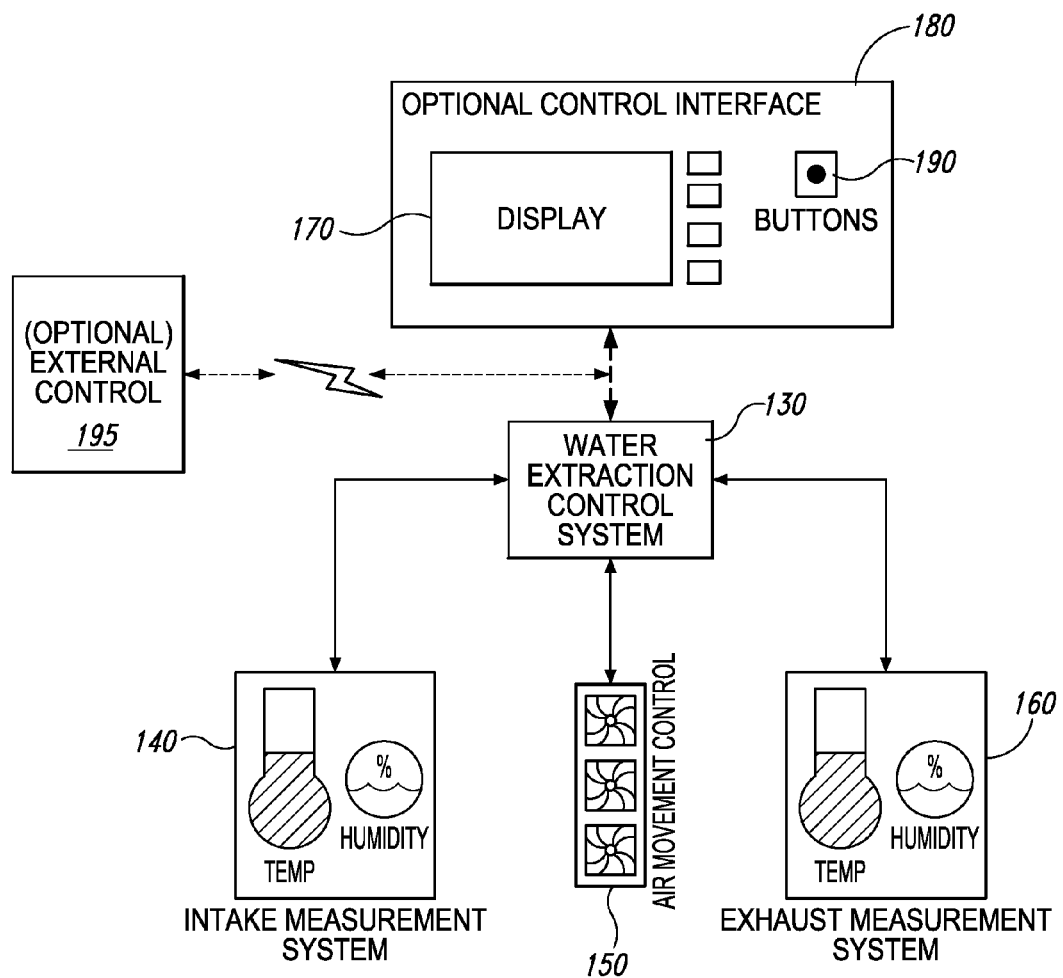
FIG. 14 is a block diagram showing an alternative embodiment of a control system according to the invention.

Controller 48, may be part of control system 130 of the water condenser to manage the air flow through a series of control elements allowing the water vapour within the ambient air to be condensed into a containing element, such as collection plate 26. As seen in FIG. 13, the control system includes air inlets 100 (an example of which is air intake 22, although a plurality of air inlets present in the water condenser may be included), which constitute the beginning of air flows in the water condenser; a water extraction system 110 which extracts water vapour from the air flow (as previously described), an air exhaust system 120 which maximizes water extraction from the ambient air and removes air after the condensation process, and a water extraction control system 130 which manages the air flow through the water condenser based on a plurality of sensors and air movement devices.

Control system 130 also includes a plurality of sensors, a microcontroller/processor (not shown) capable of receiving input from the sensors and outputting information to control the air flow system which, in turn, varies the flow rate. Water extraction control system 130 takes information from subsystems of the water condenser, including air intake measurement system 140, air movement control system 150, and exhaust measurement system 160, and uses this information to control each subsystem. Control system 130 may also include display 170 and user interface 180, with input means such as buttons 190, dials, or the like, for allowing local user control of the water condenser. Control system 130 may also include an external control system 195 for wired or wireless communication with control system 130 within the water condenser, or with control interface 180. External control system 195 may be, but is not limited to, a local or networked personal computing device, such as system controllers, PLCs, personal computers (PC's) or handheld devices. Control system 130 obtains information about the current status of the system through inputs obtained through at least one or more sensors positioned in our around the water condensor. Preferably at least a sensor is located within the air flow system of the water condenser measure the properties of the air flow entering the air intake to provide input about the properties of such air flow to compare to input received from a sensor providing input to the control system about the properties of air flow exiting the water condenser through the exhaust system. Those properties are measured to both maximize water extraction and to determine the level and efficiency of operation of other system components, including air filters, air conditioners and water conditioners.

The control system further includes both mechanical and electrical components. The mechanical components control air flow as instructed by the electrical or electronic components of the control system, to condense water vapour extracted from the air and collected within the mechanical components.

The control system measures properties in the incoming, or intake ambient air flow, including humidity and temperature, and compares these properties to the exhaust air flow using the same parameters to determine the optimal flow rate to maximize water extraction. The control system may also measure pressure changes between the intake air flow and exhaust to determine the efficiency of the exchange properties and further determine if system components require maintenance.

Using the control system includes measuring the humidity differential between the intake and exhaust, determining the optimal air speed through the water condenser's mechanical system. Optimal air speed is the air speed velocity which produces the greatest amount of condensation in the mechanical (condensing) system, thereby maximizing water extraction.

Figure 15:
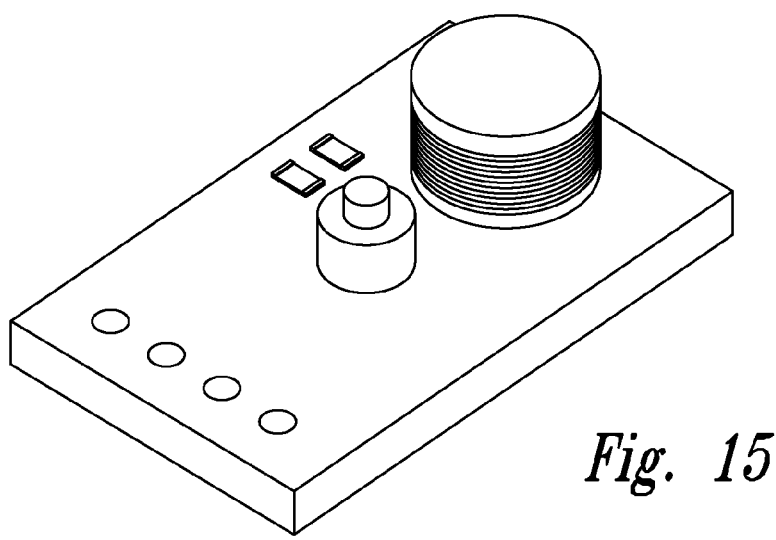
FIG. 15 is a perspective view of a sensor used in the water condenser according to the invention.

The sensors are used to measure the air flow, temperature, pressure or humidity. Preferably at least two sensors are present in the water condenser, one at the air intake and one at the exhaust. The control system may also include sensors in the condensation chambers or between filters in the filter chamber. The sensors contain circuitry to convert measurement devices within into signals that can be transmitted (for example along a cable) to the system controller/processor 48. Signal conversion at the sensor generally includes an electronic devices reacting with the electrical properties of an individual sensing device and creating a signal which can be communicated along a wired interface cable. In a general form, this means converting an analog property to a digital signal. A typical sensor is shown in FIG. 15.

The types of sensors that may be present include a humidity sensor having detection electrodes located on a semiconductor substrate and a humidity sensitive film. The humidity sensors measure either the absolute or relative humidity. The intake absolute or relative humidity is compared to the exhaust relative or absolute humidity to maximize the differential value thereby maximizing water vapour extraction.

A temperature sensor may be present having detection electrodes locate on substrates whose properties react to changing thermal conditions and can be converted or measured electrically. The differential temperature is used, in conjunction with differential humidity (either absolute or relative), to determine optimal parameters for water vapour extraction.

A pressure sensor may also be present, in particular, to measure the differential pressure between the air flow intake and exhaust and, in part, to determine the properties of the particulate filtration replacement system.

In practice, the control system reads input from the sensors, which are measuring intake and exhaust signals related to temperature, humidity and pressure. Further, the control system controls the air flow rate through the mechanical system of the water condenser. The air flow rate may be controlled by any or all of the parameters capable of being measured by the intake and/or exhaust circuits.

The intake sensing systems includes analog signal conditioners, which are passive to active converters whose properties are converted from passive uncompensated and raw measurement parameters to digital signals measurable by a controlling device, for example a digital signal processor or a microprocessor or microcontroller. A preferred signal conditioning system includes a passive sensor, active signal converters, and error sensing circuits, which use error signals to generate compensated signals indicative of the presence of water vapour; an amplifier associated with the sensor, for extracting the error signal from the active signal to generate a compensated signal, which indicates the presence of water vapour within a vicinity of the water condenser; an output signal conditioning circuit for receiving the compensated signal from the amplifier and generating a conditioned signal thereof for transmission to a microprocessor, which instructs the controller system to control a variable air flow rate transducer in the water condenser in response to a differential input and output of the conditioned signal to the microprocessor from the amplifier.

These input conditioning circuits and measurement devices are used to determine the differential humidity and temperature. The air flow rate is then controlled to maximize the differential humidity between the intake and exhaust systems. This differential humidity is used along with temperature measurements to maximized water vapour extraction.

The air flow is controlled with mechanical devices under the control of the control system. The air flow is measured as a percentage of the maximum speed or flow rate as directed by the mechanical devices: 100% being the maximum speed or flow rate through the mechanical system of the water condenser.

The control system reads the input sensing devices converted signals and compares those signals to the exhaust sensing devices converted signals. The air flow is then controlled to maximize the humidity differential between those sensors. The temperature is measured, and used, to limit the mechanical system so as not to cool the air so as to cause water vapour to freeze in the condensation system. Having both humidity and temperature measurements allow the control system to compute a dew point which is used in the decision matrix for air flow rate control.

The control system also may switch between condensing profiles switching algorithms and control parameters. Parameters are those inputs into the control system that are either measurable or calculated. Calculated parameters can be derived from the measurable sensor signals, or from other parameters such as time.

Time is used as a parameter to filter or average readings from the sensors. This average or filter is adjustable in time to provide longer or shorter periods of adjusting damping factors which vary the control rate of the air flow system. The air flow system output control may be adjusted based on profiles adjustable by the outside control system or through the user display/switch interface or both.

Two primary control algorithms are used in the system, a time-rate-variable (TRV) algorithm and a proportional integral derivative (PID) algorithm. A PID control system is a common feedback loop component in industrial control systems. In this process the control system compares measured values from a process with a reference set point value. The PID controller can adjust process outputs based on the history and rate of change in an error signal. The PID algorithm is used when the control system is being used to obtain a set point humidity or temperature differential. This is different from the time rate variable system which is used when the control system is maximizing its differential humidity and/or temperature values.

The time-rate-variable (TRV) system includes elements of PID control theory however in this instance there is no known set point value. The set point is not predetermined but is dynamic within the control system and changes depending on the air qualities. Further, this 'set point' is continually optimized to maximize water extraction based on humidity and temperature. If the control system includes a pressure sensor, this sensor is used to assist the primary control algorithm as the air flow rate through the system may be reduced due to pressure build up in the exchange chambers.

TRV is used by setting the initial measurements of the sensing system, at TO. At TO the flow control system will be set to 0 or to a value near 0. The sensors are read to determine the differential conditions at TO. The flow rate control is then increased to a slow idle speed as determined by the mechanical flow actuators. The flow rate of mechanical actuators normally have a low speed idle condition such that if set below this point, cause the flow rate to decrease from this minimal value to 0. This may not be proportional to the control values. For example, an output control rate of 12% may not be enough to cause the mechanical actuators to move air, whereas 13% may cause air to move.

The sensors are again read at some time TI after this initial condition where TI is set by the system but is a profile set variable. At time TI, the controller uses these measured parameters to determine if the flow rate should be increased. Generally speaking an increase in the flow rate is expected after the initial conditions. It is also expected there will be some or no increase in humidity differential and this measurement is used as the basis for further control of the flow system.

At this time T1, the speed is increased to rate approaching, but less than the maximum (100%) as determined by the formulate;

New Flow Rate (%)=(((100%−Current Flow Rate)
12)+Current Flow Rate) (%)    Formula 1:
Flow Rate Control: Increasing Adjustment Some time later, at time T2, a value proportional to TI-TO, a new set of sensor measurements are used to compare the previous humidity differential with the new humidity differential to determine if these differential values are increasing or decreasing. The goal of the control system is to increase this humidity differential to its maximum value. The maximum value is the value at which if the flow rate was increased, the measured humidity differential would fall.

If the humidity differential is larger at time T2 than at time TI, the control system then increases the air flow according to the formula 1 listed above but the Current Flow Rate will be the last flow rate used to control the mechanical system. This has the effect of increasing the flow towards 100% in decreasing steps which are effectively half way between where it is currently set and 100%.

This process continues until the maximum is reached as describe above. Once this has been reached, the flow rate is decreased in small increments based again on previous measurements as reflected in the following formula;

New Flow Rate=((Current Flow Rate−
Last Flow Rate)/2)−Current Flow
Rate)−K where K, is a constant to
guarantee there is at least a differential control
state    Formula 2: Flow Rate Control: Decreasing Adjustment The constant K, in formula 2 causes the algorithm will step the air flow rate down in the event the previous air flow rate and the current flow rate are the same. This differs from the increasing formula (formula 1) because in the increasing air flow rate case, 100% maximum can continue to be used as long as the humidity differential appears to be a maximum at the maximum air flow rate.

The controller recognizes the humidity of the incoming air and the discharged air, strives to control the air volume and maximize the performance of the water condenser by adjusting the air volume (e.g., controlled by the fan) until there is a maximum difference between the humidity of the incoming air (ambient air) and the humidity of the discharged air. This difference represents the "most water removed" from the ambient air.

The algorithm may be programmed to being the fan speed of 50% (which is adjustable by the controller), but other starting fan velocities could be used, and takes an initial reading of the sensors. The fan speed is then increased by a certain amount as determined by the above algorithms (for example 10%, which is also adjustable by the controller), following which, the sensor outputs are received. If an improvement is seen (a bigger difference between the humidity readings at the air inlet and exhaust) the fan speed is increased further. If no improvement occurs in relation to the last measurement, the controller will determine that it is making changes in the "wrong" direction, and will then decrease the fan speed until an improvement is recorded. Regardless of direction (increase or decrease) the change in fan speed will be made until no change is seen in the sensors. It will reverse direction to return to the last fan speed that shows the biggest spread between the sensors. The fan speed will be maintained until a change is seen in one of the sensors. At this time, the processor will again "hunt" for the correct fan speed.

This sampling can be done as often as preferred. Alternatively, the sensors could be comparing temperatures, rather than humidity. Also rather than changing fan speed, air passages or inlets could be opened or closed. Preferably, the ideal location within the system will be determined for where the internal air flow should be reaching its dew point. This location might be between the heat exchanger and the evaporator plates (in the first pass) but other locations are usable. A controller with sensors monitors environmental conditions and calculates internally what the dew point is. Sensors are placed within the system such as mentioned above, allowing the controller to monitor the sensors, and thereby determining the temperature with respect to the dew point. Thus, if the optimal system function is to create a dew point near the sensor the controller will slow down or speed up the fan in a continual effort to optimize the system. In another embodiment a pressure differential gauge may be used to offer feedback to the control system assisting in its function to optimize the air flow. The present system is designed to keep the air flow just below the dew point and to track the dew point continuously as conditions change. As seen in the test data set of FIG. 12, the dew point is continuously tracked by the processed air temperature ensuring optimal operation.

In an alternative embodiment as seen in FIGS. 7-10 and 10a the primary and auxiliary air flows are entirely separate. Whereas in the previously describe embodiment, the primary air flow after passing through the air-to-air heat exchanger wherein the lowered temperature of the primary air flow leaving the refrigerant evaporator is used to pre-cool the incoming primary air flow rather than be wasted, and the primary air flow then flowing into the manifold wherein it is mixed with the auxiliary air flow so as to provide the increased mass flow volume for the refrigerant condenser, in this embodiment, control of the primary air flow is provided by a separate fan for increased accuracy of control of the primary air flow through the two cooling stages namely the heat exchanger and refrigerant evaporator.

Thus as may be seen in the figures, fan 60 draws auxiliary air flow through refrigerant condenser 62 in direction M via intake 64. As before, the refrigerant condenser is in the same refrigeration circuit as the refrigerant evaporator, that is, is in the same refrigeration circuit as the second cooling stage. As before, an air-to-air heat exchanger provides the first cooling stage. Thus the primary air flow, as before, enters the heat exchanger prior to entry into the refrigerant evaporator. In particular, primary air flow enters air-to-air heat exchanger 66 in direction N through a lower intake 68 having passed through air filters as previously described (not shown). The primary air flow passes through hollow conduits 66a across the width of the heat exchanger, exiting conduit 66a in direction P so as to be turned one hundred eighty degrees in end manifold 70. The primary air flow then flows between refrigerant evaporator plates 72 in direction Q wherein the primary air flow is cooled below its dew point without freezing. Moisture thus condenses out of the primary air flow onto plates 72 and is harvested through a spout 74 into a collection pan or the like (not shown).

The primary air flow exits from the refrigerant evaporator through slot 76 and travels in direction R downwards between conduits 66a so as to exit heat exchanger 66 in direction S through slot 78. The primary air flow is then drawn through fan housing 80 and fan 82 so as to exit as exhaust from fan 82 in direction T.

The de-linking of the primary and auxiliary air flows so as to require separate fans, respectively fans 82 and 60, provide for condenser 62 functioning at a greater capacity without affecting optimization of the balance of the cooling between the first and second cooling stages of, respectively, the heat exchanger 66 and the evaporator plates 72. Thus the lower volume fan 82 may be controlled by a processor (not shown) to determine the current environmental conditions affecting optimization of cooling and condensation for example by varying the power supplied to fan 82 to thereby control the velocity and mass flow rate of the primary air flow through the two cooling stages. Thus the primary air flow may be drawn through the cooling stages at a velocity which is not so high as to affect the maximum condensation of moisture, and not too low so as to waste energy in cooling the primary air flow too far below the dew point. Thus by monitoring environmental conditions, as previously described, for example the humidity and temperature, the fan speed of fan 82 may be selectively controlled to optimize production of condensation regardless of ambient environmental conditions. Thus in a very humid environment, fan 82 will be powered to draw a higher mass flow rate of the primary air flow through the two cooling stages, whereas in lower humidity conditions the primary air flow will require more time to optimize the condensation and thus slower fan speeds may be used to provide for optimized condensate production.

Figure 5:
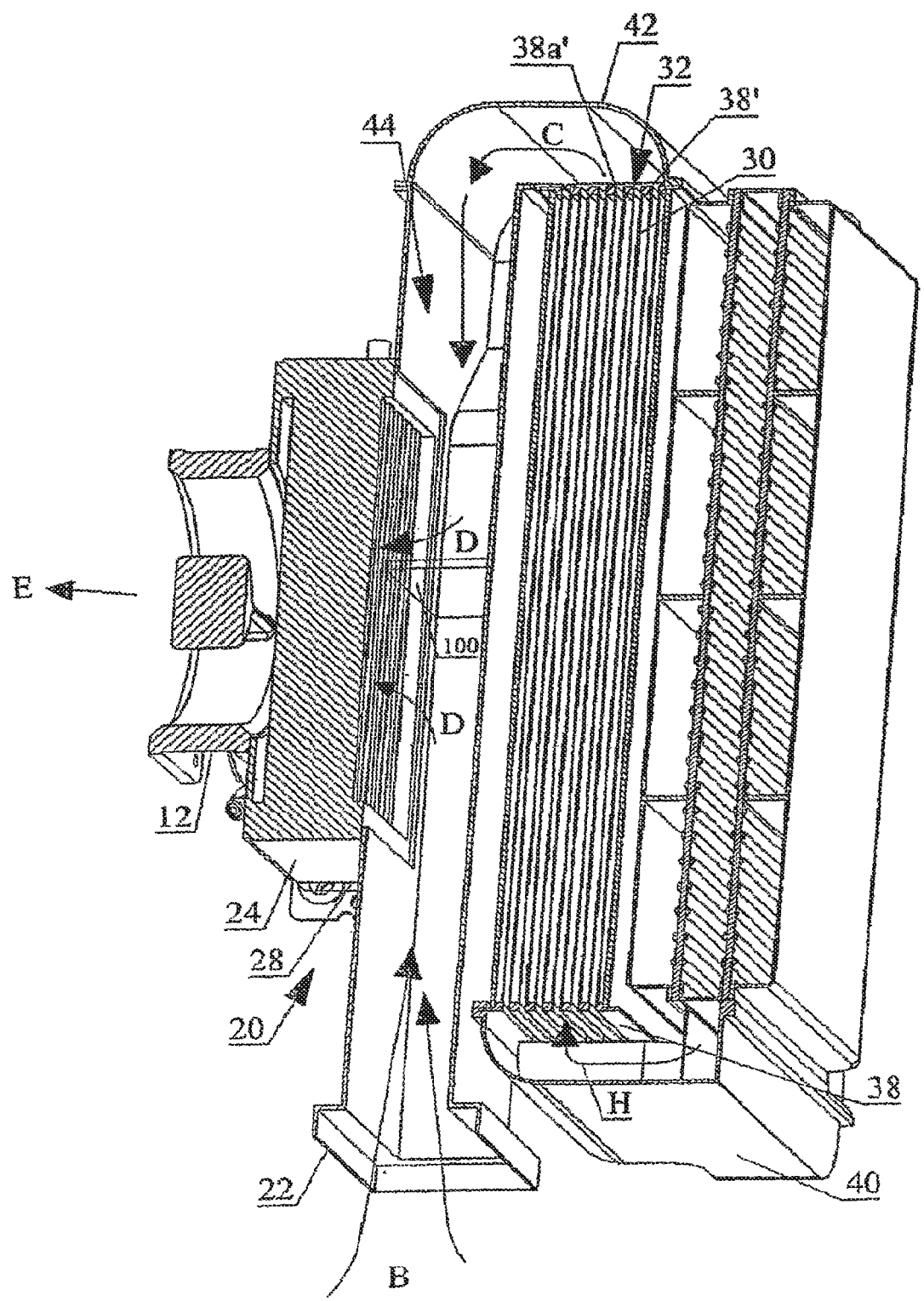
FIG. 5 is the view of FIG. 3 in an alternative embodiment wherein the air flow manifold feeding the refrigerant condenser is partitioned between the primary and auxiliary air flows.

In the further embodiment of FIG. 5, a partition 100 partitions manifold 20 so that the primary and secondary air flows do not mix. For example, partition 100 may bisect the intake into refrigerant condenser 24. Otherwise, partition 100 may be mounted relative to the intake into refrigerant condenser 24 so as to provide a greater volume of auxiliary air flow in direction D flowing through condenser 24. The air speed velocity and mass flow rate of the primary air flow through the two cooling stages of the heat exchanger and refrigerant evaporator respectively, may be, for example, controlled by selectively positioning the position of partition 100 relative to condenser 24 or otherwise by, in conjunction with, the use of air flow dampers or other selectively controllable air flow valves.

The appropriate processing of ambient air provides for optimal operation of the condenser unit. While conventional condensers may simply drive high volumes of air through a cooling system (typically just an evaporator without a heat exchanger), these systems have not accommodated a system designed for power efficiency as is in the present invention which employs techniques to extract the maximum quantity of water with the least power requirements. This may be accomplished in a number of ways, as follows.

Environmental conditions are monitored by the system and at an appropriate point in the system, such as between the heat exchanger and the evaporator (first pass) the temperature relative to dew point is monitored. If the air at this point is too far above dew point the fan that draws air through this section of the unit may decrease its speed thus slowing the air and allowing more time for the air to cool prior to reaching the evaporator plates. If the air at this point is below dew point then the system may increase the fan speed and continue to optimize the air flow stream. Other conditions throughout the device may be monitored as well and this information may be used by controller 48 to further tune the device. Humidity levels leaving the system may be used as a means to determine exactly how much water has been extracted from the air and with this information, the system may modify its configuration thus ensuring optimal performance.

Figure 6:
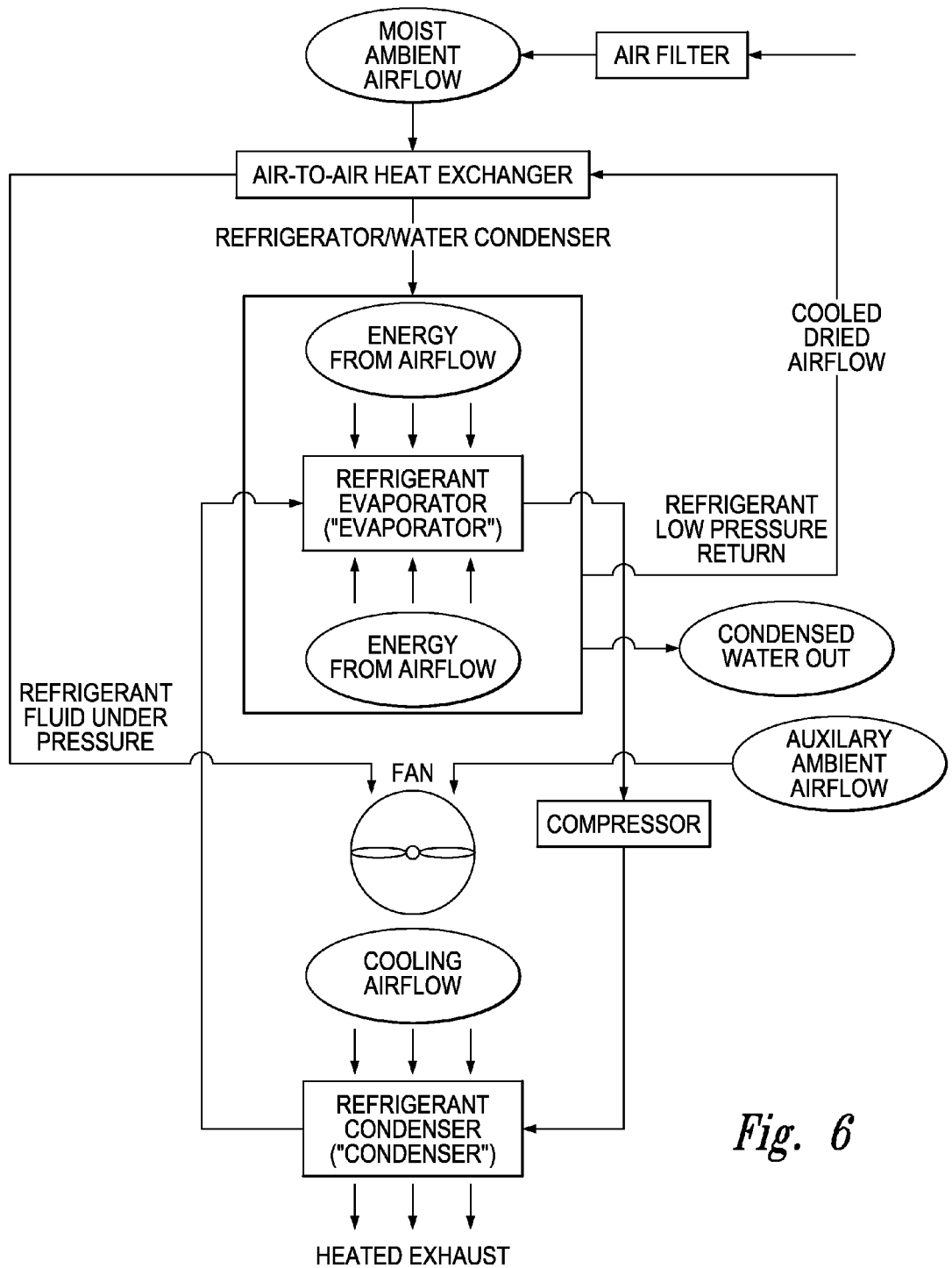
FIG. 6 is a diagrammatic view of the pre-cooling and condenser cycle and closed loop refrigerant circuit according to the embodiment of FIG. 1.
Figure 6A:
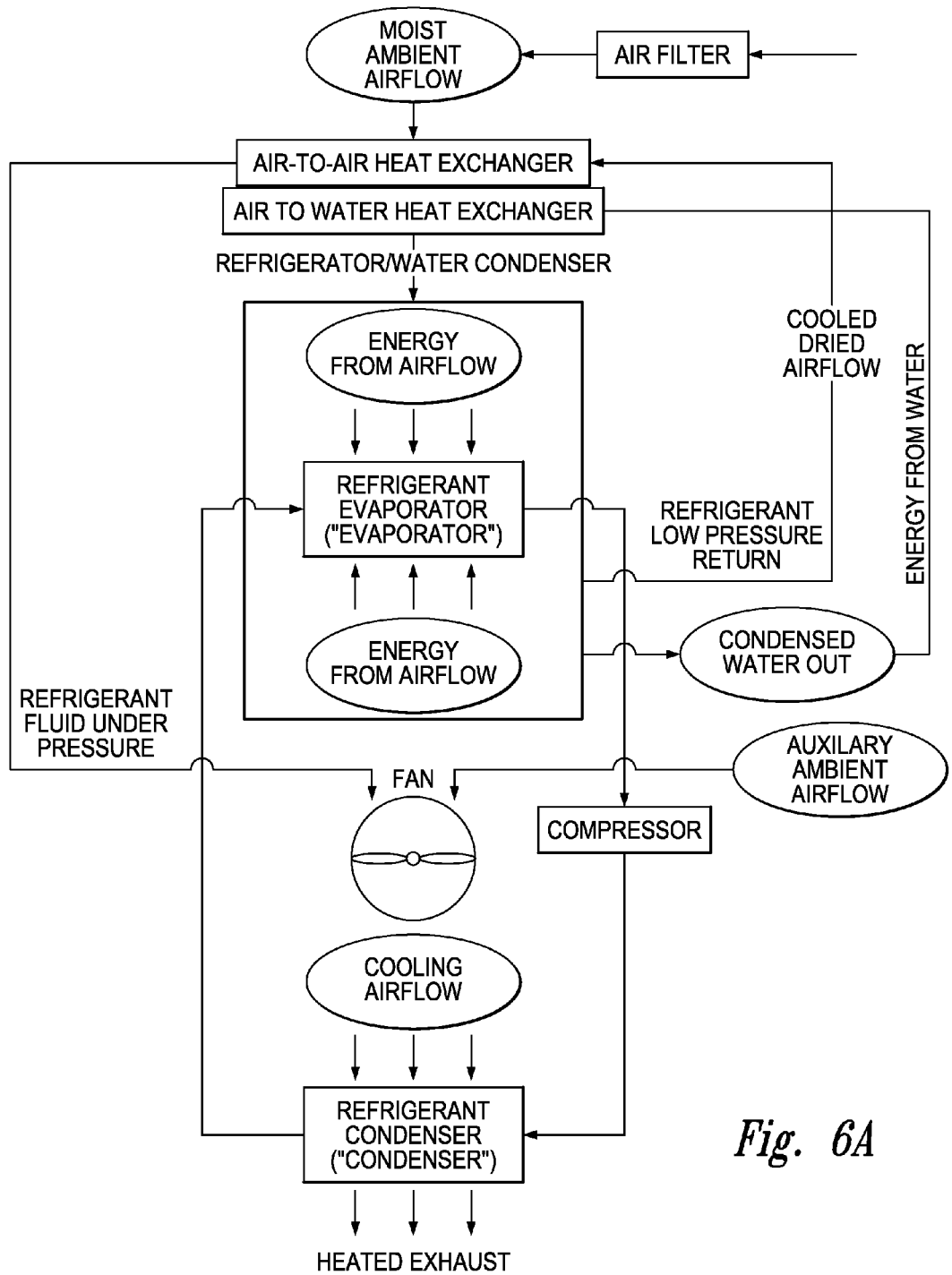
FIG. 6A is the view of FIG. 6 showing an air-to-water heat exchanger downstream of the air-to-air heat exchanger.
Figure 6B:
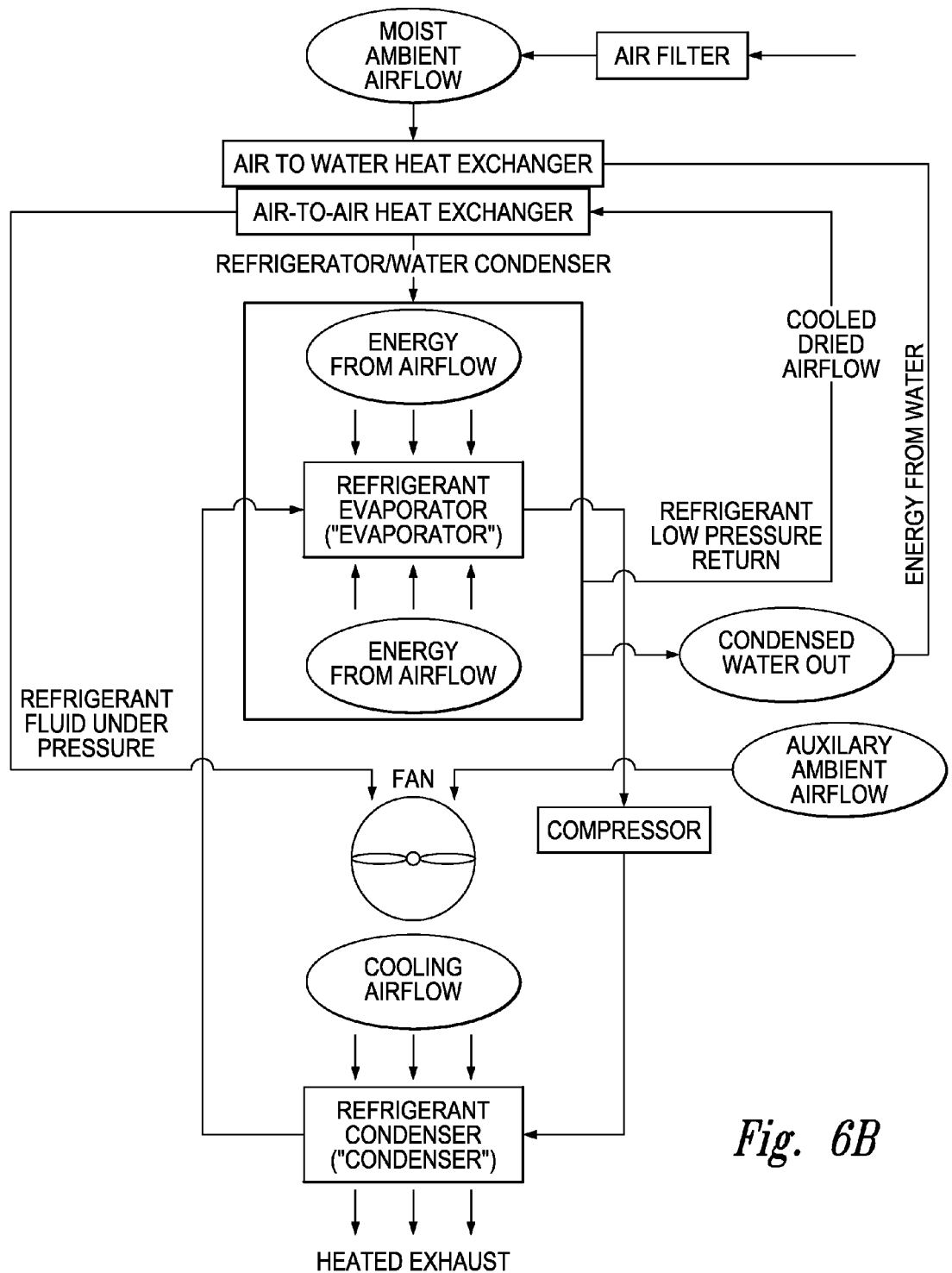
FIG. 6B is the view of FIG. 6 showing an air-to-water heat exchanger upstream of the air-to-air heat exchanger.
Figure 7:
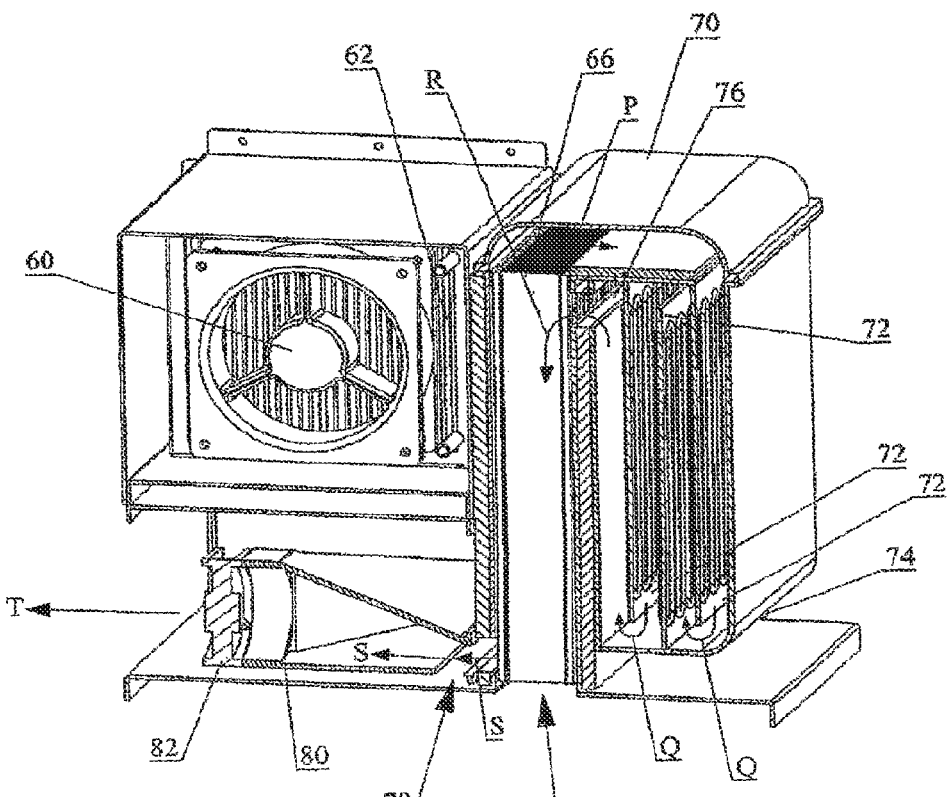
FIG. 7 is, in partially cut away front right side perspective view, an alternative embodiment of the present invention wherein two separate fans draw the primary and auxiliary air flows through the evaporator and condenser respectively.
Figure 8:
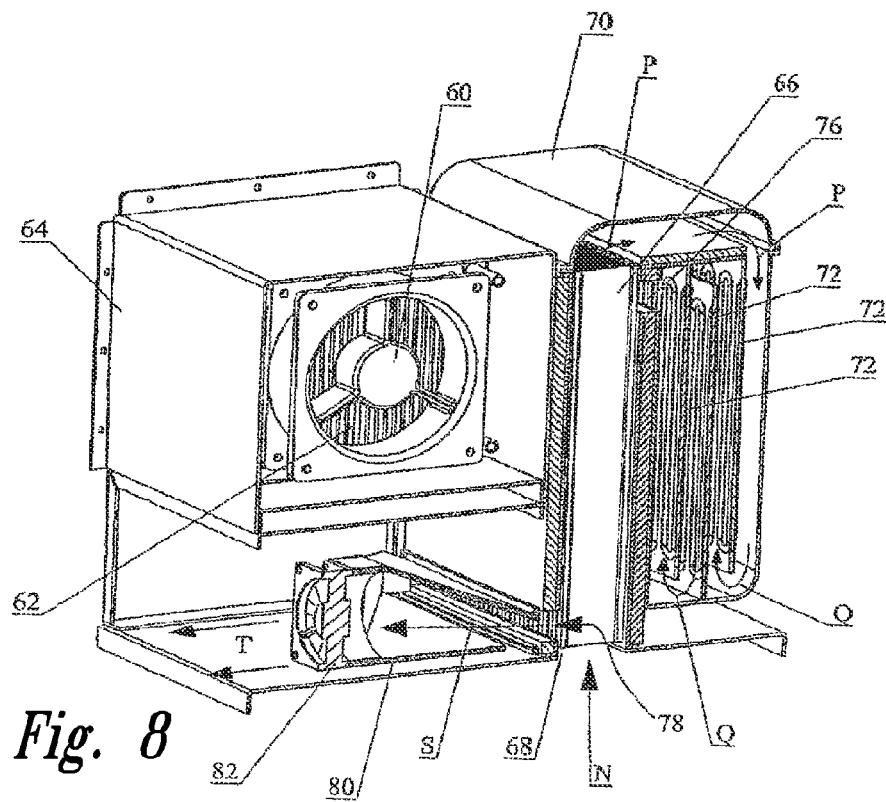
FIG. 8 is, in partially cut away front left side perspective view, the embodiment of FIG. 7.
Figure 9:
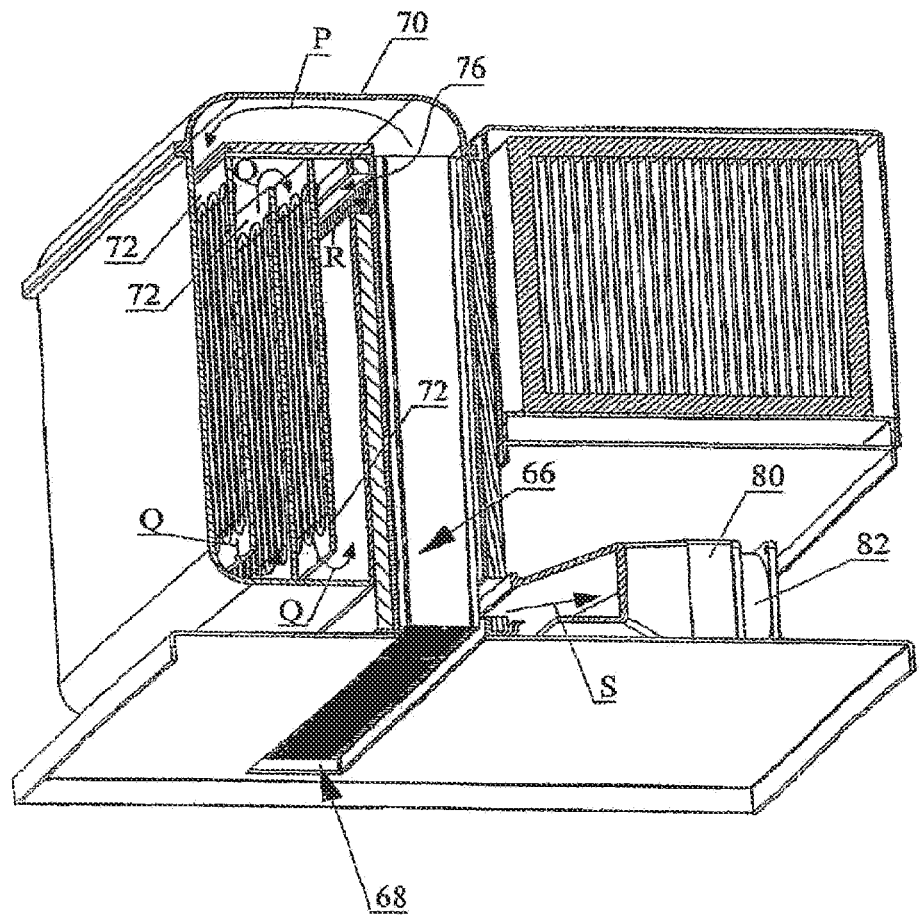
FIG. 9 is, in partially cut away rear perspective view, the embodiment of FIG. 7.
Figure 10:
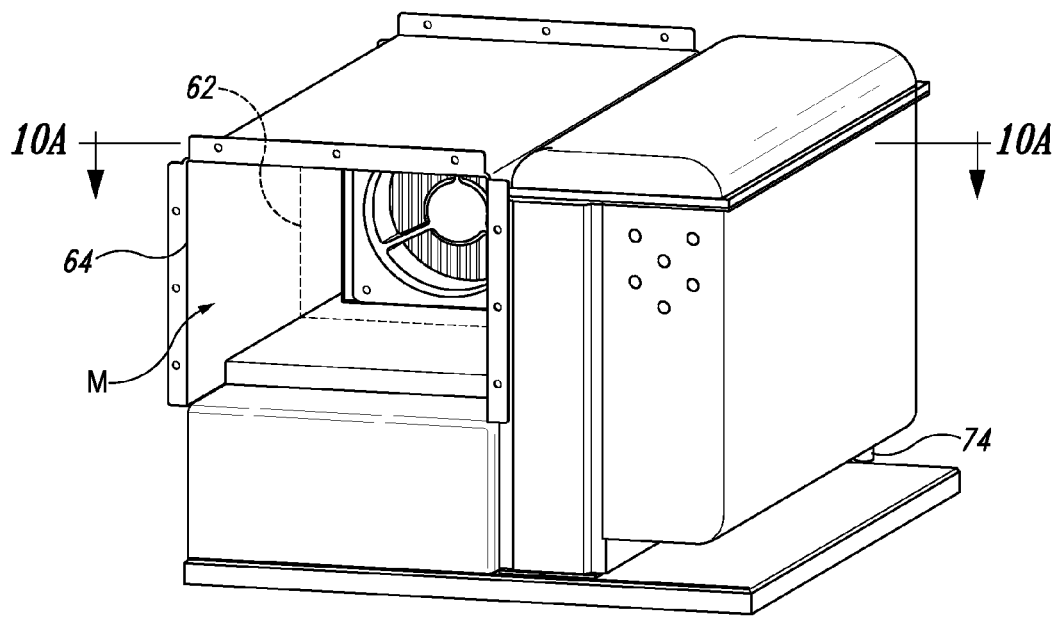
FIG. 10 is a partially cut away rear perspective view of the embodiment of FIG. 7.
Figure 10A:
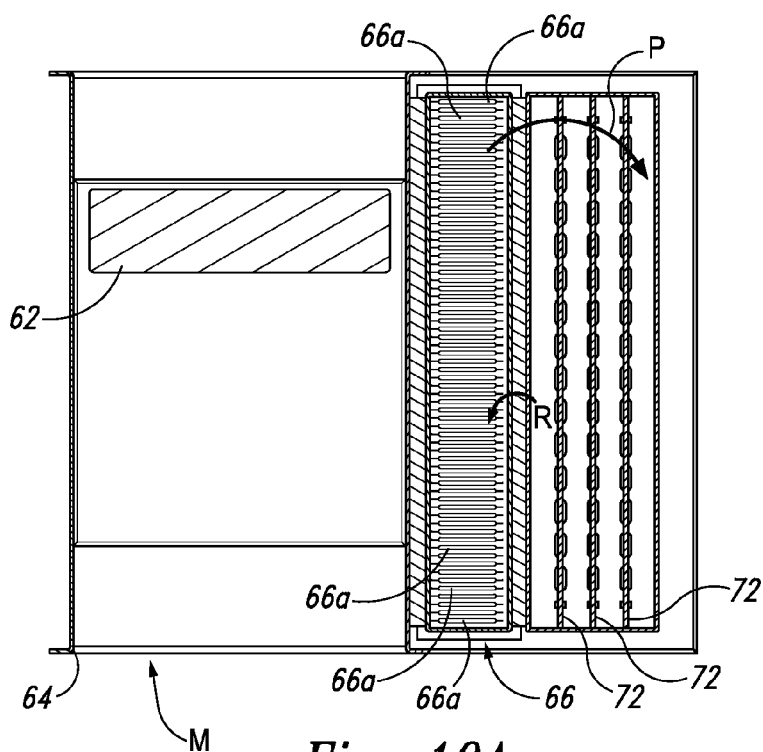
FIG. 10A is a sectional view along line 10a-10a in FIG. 10.
Figure 11:
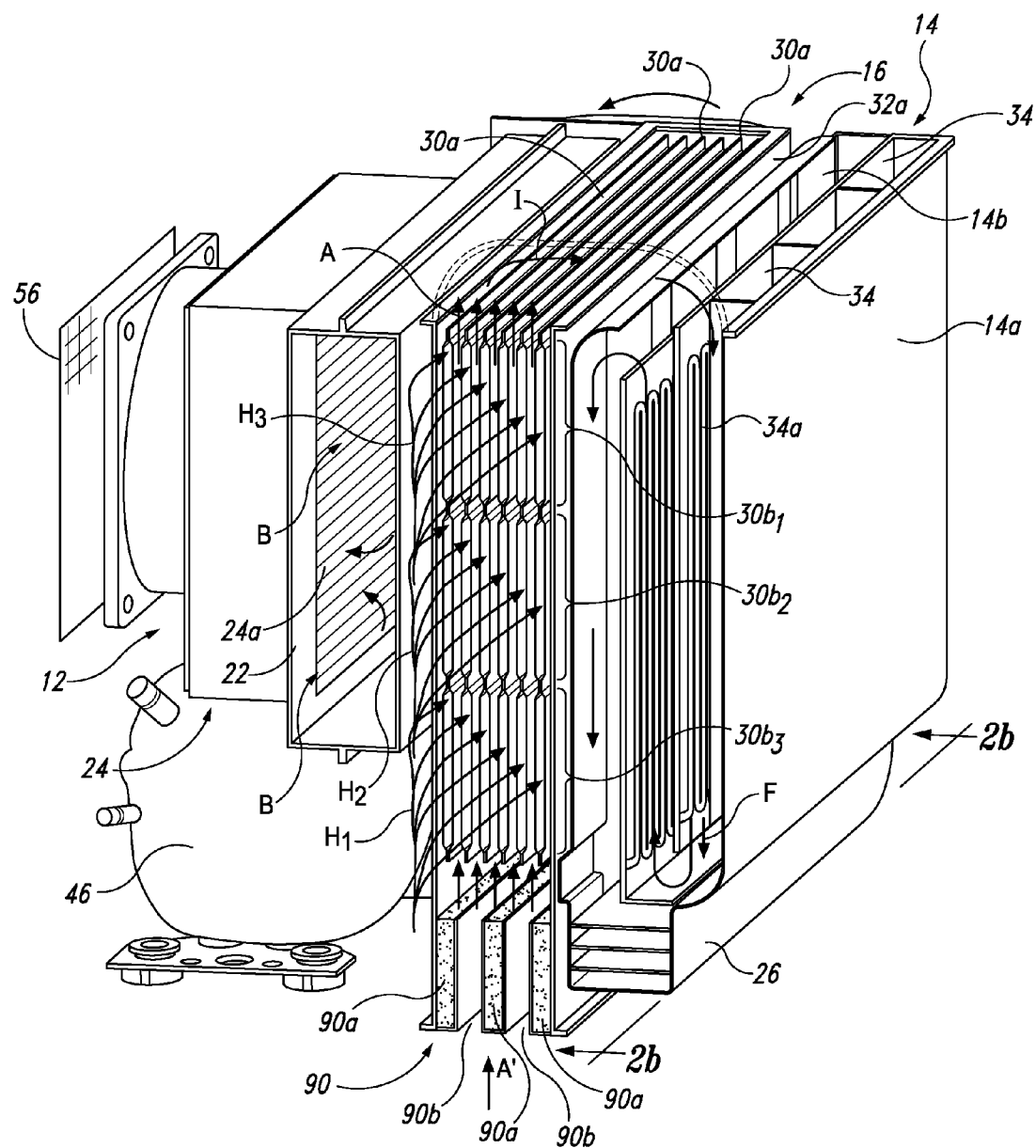
FIG. 11 is, in partially cut away perspective view a further alternative embodiment of the present invention wherein the primary air flow passes through an air-to-water heat exchanger.
Figure 11A:
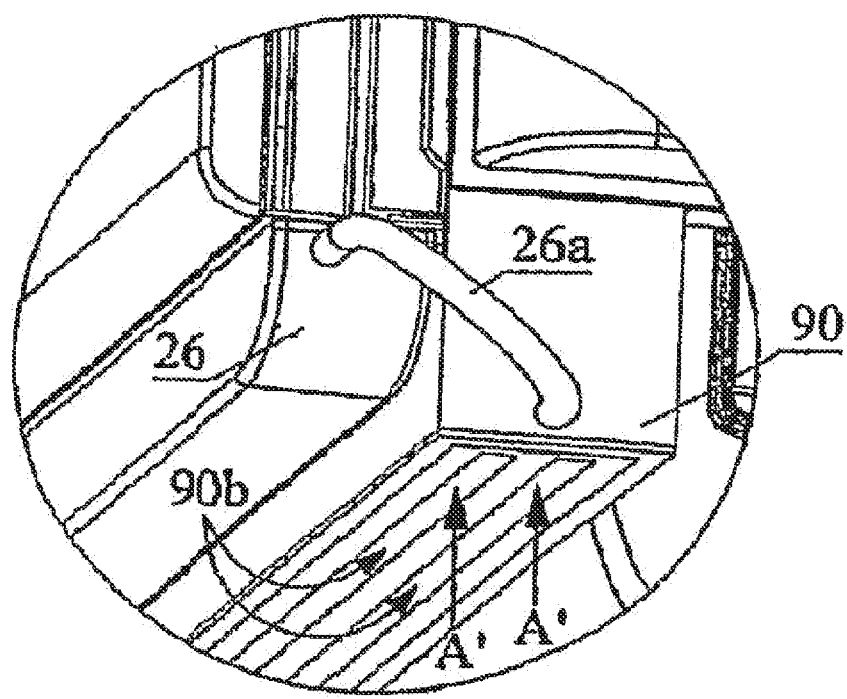
FIG. 11A is an enlarged perspective view of a portion of the air-two-water heater exchanger of FIG. 11.

In the alternative embodiment of FIGS. 6B, 11 and 11A, air-to-water heat exchanger 90 is mounted upstream of the air-to-air heat exchanger along the primary air flow. Water collected in moisture collector 26 is directed for example by conduit 26*a* into water reservoir 90*a* from which the water may be collected for end use. The water in reservoir 90*a* is chilled, having just been condensed into and recovered from the evaporate plates. Thus the primary air flow passing through air conduits 90*b* in direction A' is cooled by the water cooling the conduits 90*b* before the primary air flow enters the air-to-air heat exchanger for further pre-cooling as described above. This further improves the efficiency of the condenser as it takes advantage of the cold temperature of the collected water.

Figure 16:
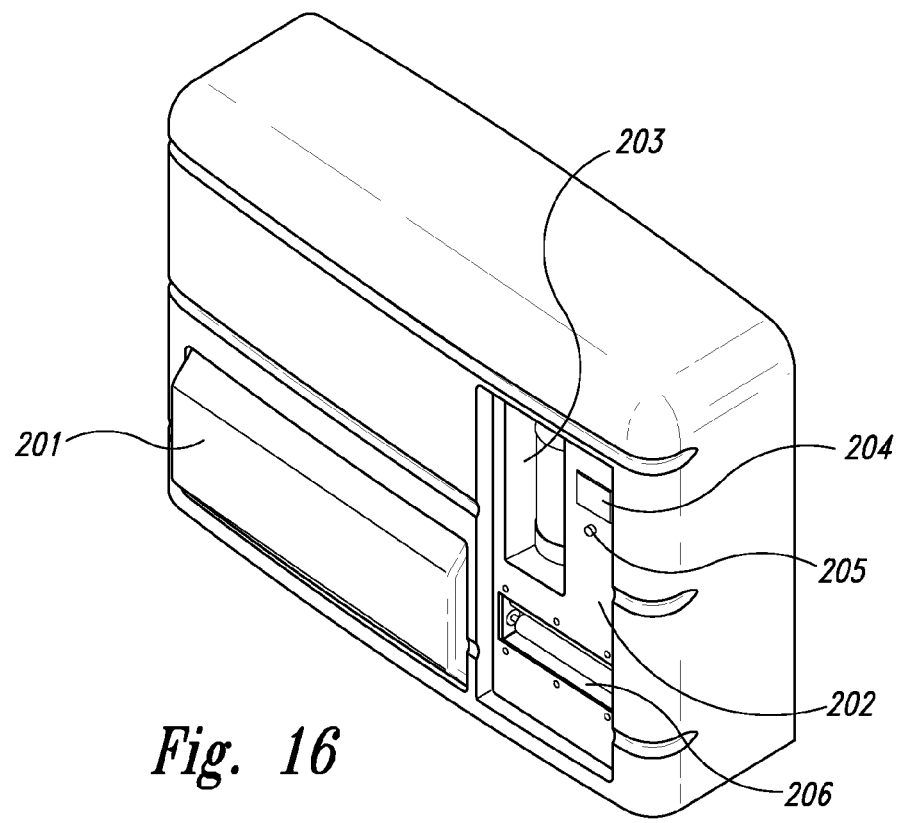
FIG. 16 is a front perspective view of an alternative embodiment of the invention.

A further embodiment of a water condenser according to the invention is illustrated in FIGS. 16 through 25, which can be mounted on a wall or the like. As seen in FIG. 16, ambient air is drawn into the water condenser through air grill 201 where it then passes through the intake air filter designed to clean the incoming air. To allow for easy access to the interior of the water condenser for the user, there is an access door on the front of the device (removed in FIG. 16). This door covers encasement 202 holding replaceable water filter housing 203, replaceable UV light housing 206, and LCD display 204. Replaceable water filter housing 203 allows access to remove and replace the water filter. LCD display 204 offers relevant information regarding the status of the water condenser to the user. Touch control 205 allows the user to scroll through the various functions offered by the controller mechanism.

Figure 17:
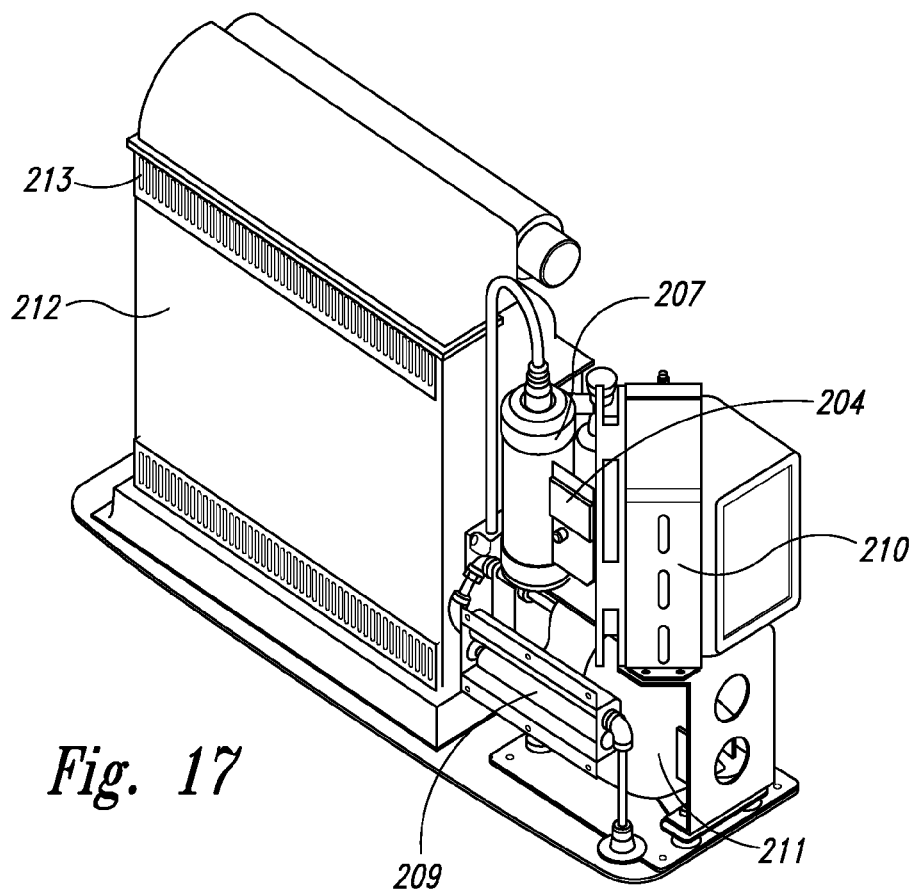
FIG. 17 is a front perspective view of the embodiment shown in FIG. 16, wherein the cover has been removed.
Figure 18:
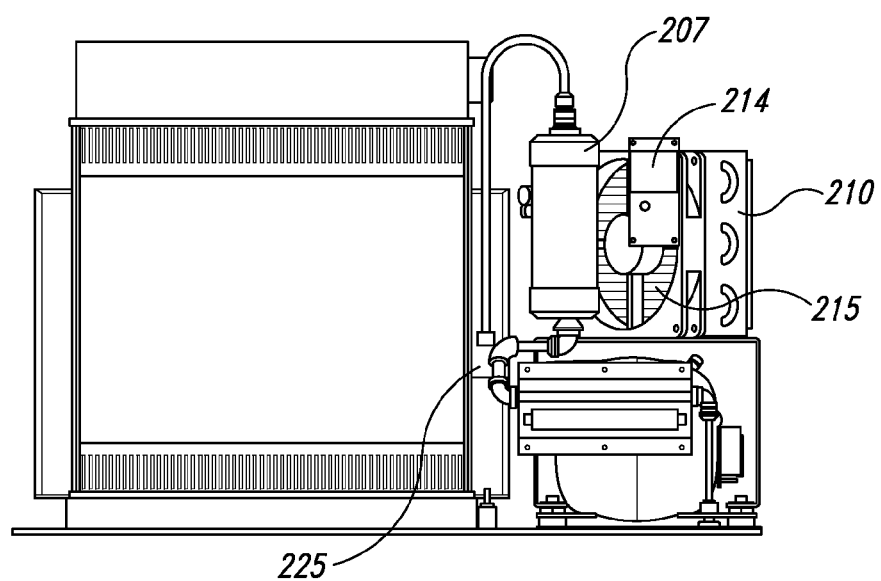
FIG. 18 is a front view of the embodiment shown in FIG. 17.
Figure 19:
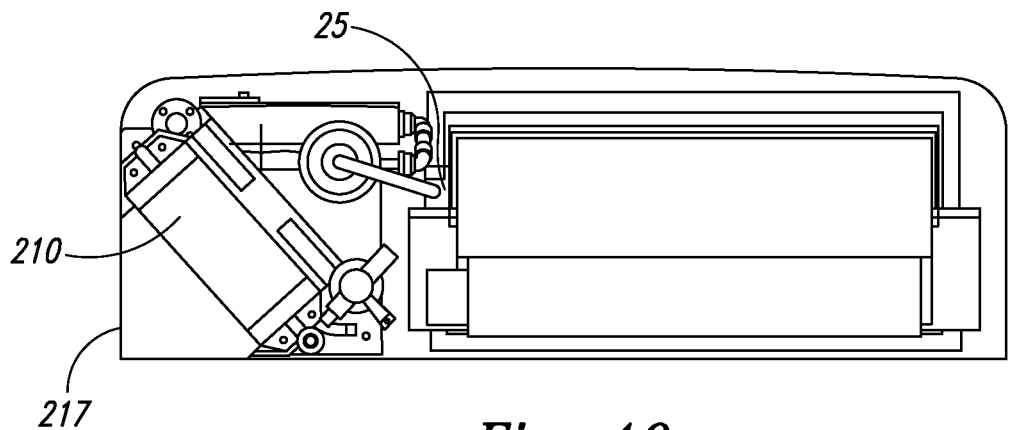
FIG. 19 is a top view of the embodiment shown in FIG. 17.
Figure 20:
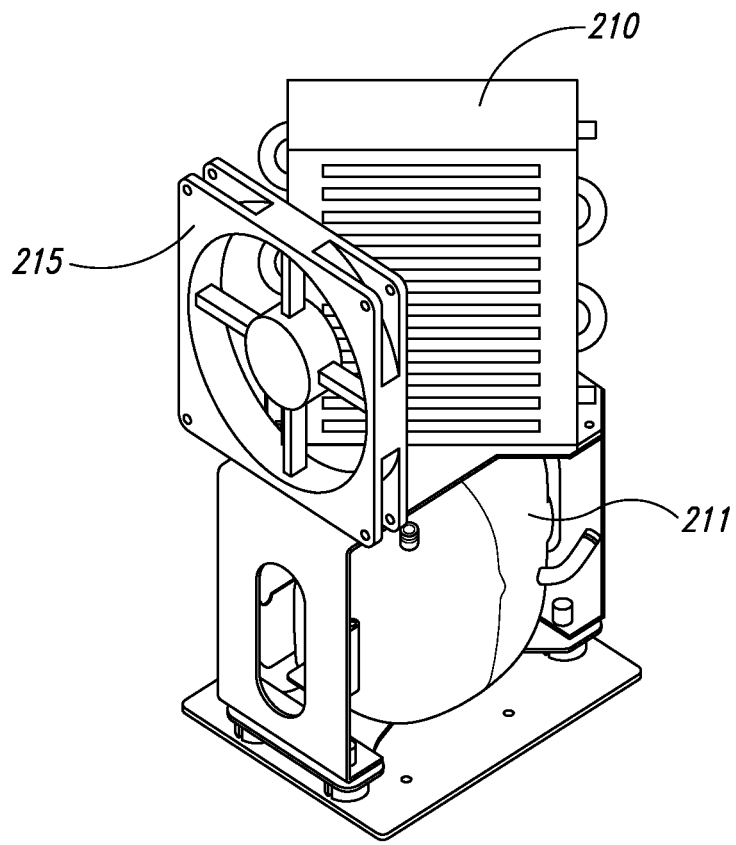
FIG. 20 is a perspective view of a portion of the embodiment shown in FIG. 17 showing the placement of the condenser relative to the condenser fan and compressor.

As seen in FIG. 17, water condenser includes water filter 207, LCD display 204, UV light 209, condenser 210, and compressor 211. Heat exchange system 212 may include bypass mechanism 213 (preferred in cooler climates) which allows air to bypass heat exchange system 212. Water condenser also includes, as seen in FIG. 18, circuit controller 214 and condenser fan 215. Condenser fan 215 may be angularly offset to minimize the dimensions of the water condenser. Condenser 210 may be similarly angled to reduce the required thickness of the water condenser device. As seen in FIG. 19, water condenser exhausts dry air through from condenser 210 through grill 217 on the side of the device.

Figure 21:
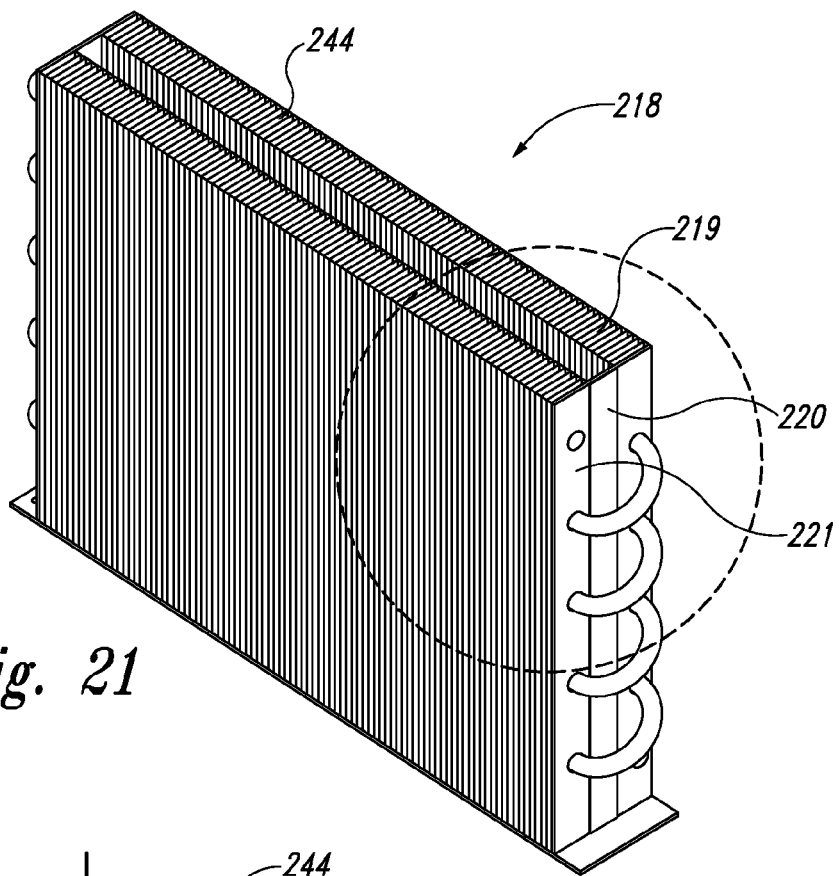
FIG. 21 is a perspective view of an evaporator according to the embodiment of the invention shown in FIG. 17.
Figure 21A:
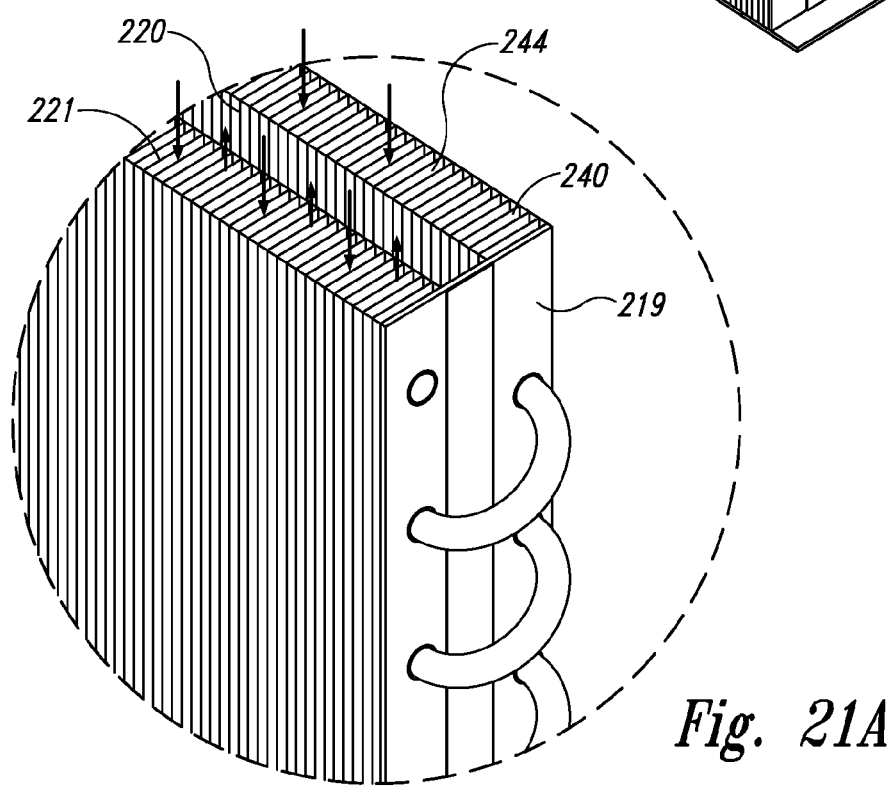
FIG. 21A is an enlarged view of a portion of FIG. 21.

Evaporator 218, as seen in FIGS. 21 and 21A is designed to maximize water condensation and to address challenges faced with conventional evaporator technology. Conventional evaporators have insufficient spacing between the plates/fins to allow a drop of water to freely fall without coming in contact with the opposing plate/fin. Evaporator 218 provides spacing 240 between the plates 244 sufficient for water droplets to fall without coming in contact with and bridging the space between the adjacent plate 244. Such spacing is preferably 110% to 140% of the average drop width (for example 125%). This allows water to be removed from evaporator 218 and new water to be formed efficiently and resolves a problem in the prior art wherein multichannel evaporators pass air travelling upward through an evaporator section, thereby causing negative pressure created by the air flow, which holds water on the plates especially at the bottom of the device. This causes water to collect and bridge across multiple cooling plates, thereby obstructing the efficiency of water being created. To overcome this challenge, evaporator 218 is divided into three independent sections, which allow air flow to only travel downward through the sections having cooling plates. For example, the air flow will travel down through the first section 219 of the evaporator 218 and then upward through middle section 220 where no plates are present, and then travel down through the third section 221, which has plates, thereby allowing air to only travel downward through cooling plates thus alleviating the negative pressure water bottleneck that diminishes system efficiency and creates less water.

An additional component that may be used to increase the efficiency of evaporator 218 is a tapping or vibrating member (not shown) used to shake water off plates 244. Tapping member could be an offset weight attached to a small motor timed to vibrate for a short duration at set intervals or may be a coil wrapped around a movable magnetic rod that with short bursts of current produced by the water condenser (e.g. collected in a capacitor) will tap evaporator 218 thus assisting in removing water from plates 244.

Figure 22:
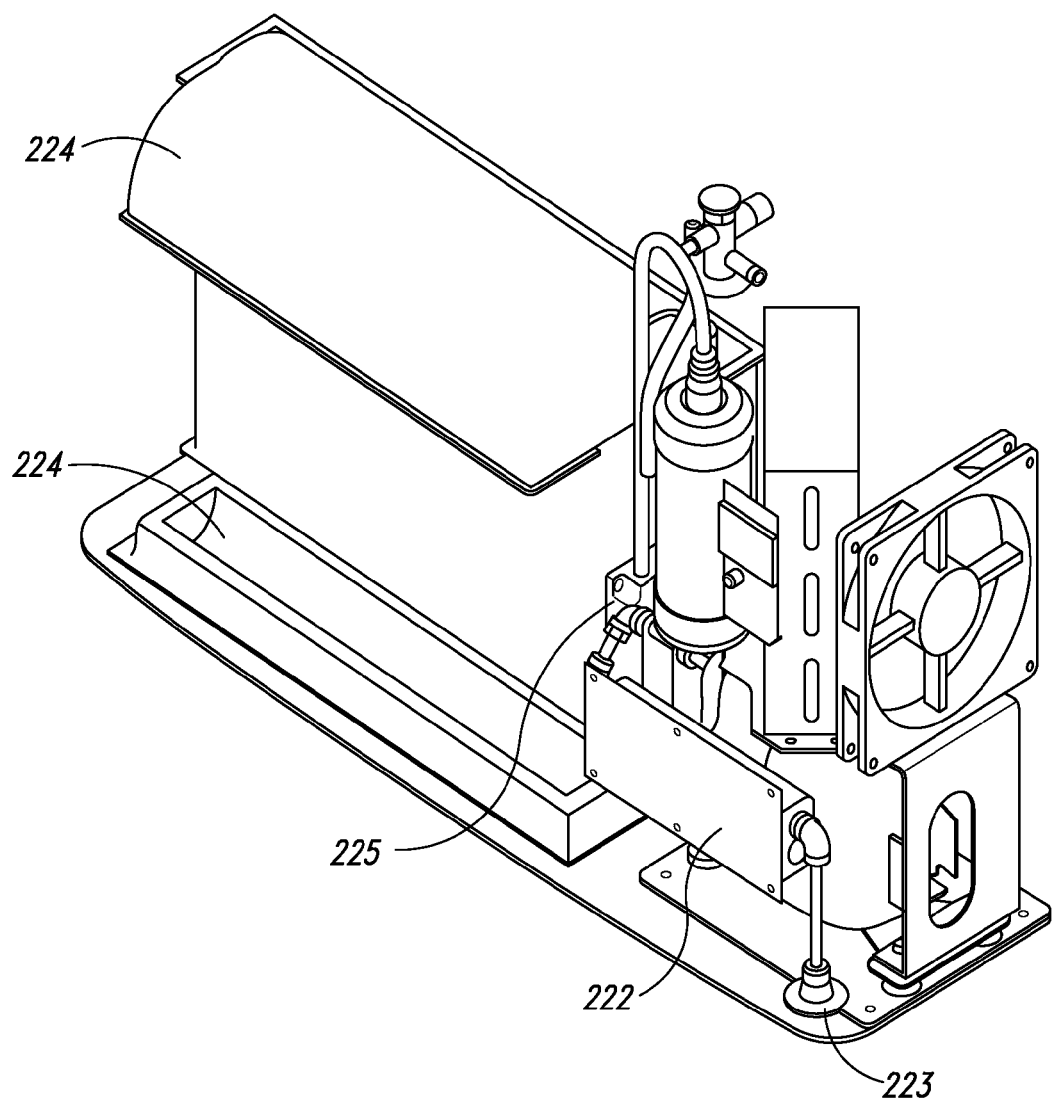
FIG. 22 is a perspective view of a portion of the embodiment shown in FIG. 17.

As seen in FIG. 22, removable cover 222 covers UV light 209. Outgoing water line 223 is where water exits the condenser. This water line may exit the device from its side rather than underneath the device should the design call for the device to sit on a flat surface such as a countertop. Additionally, there may be a water containment system with similar dimensions to the device directly beneath the device to collect water created and allow users easy access.

If such a containment system is positioned underneath the condenser, the condenser may draw water from such containment system and circulate this water through the filtration part of the condenser to ensure the quality of the water even if it has been sitting for a period of time. This could be done for short periods of time on set intervals (e.g. 20 mm/day).

Base 224a of the device includes means to control air flow and to capture water. Base 224a is positioned below heat exchanger 212 capturing water that might be created by heat exchanger 212. Above heat exchanger 212, is ducting mechanism 224b that creates air flow through various components as needed by the device. The device may include a water pump 225 to move water through various components, such as through water filter 207.

Figures 23, 23A:
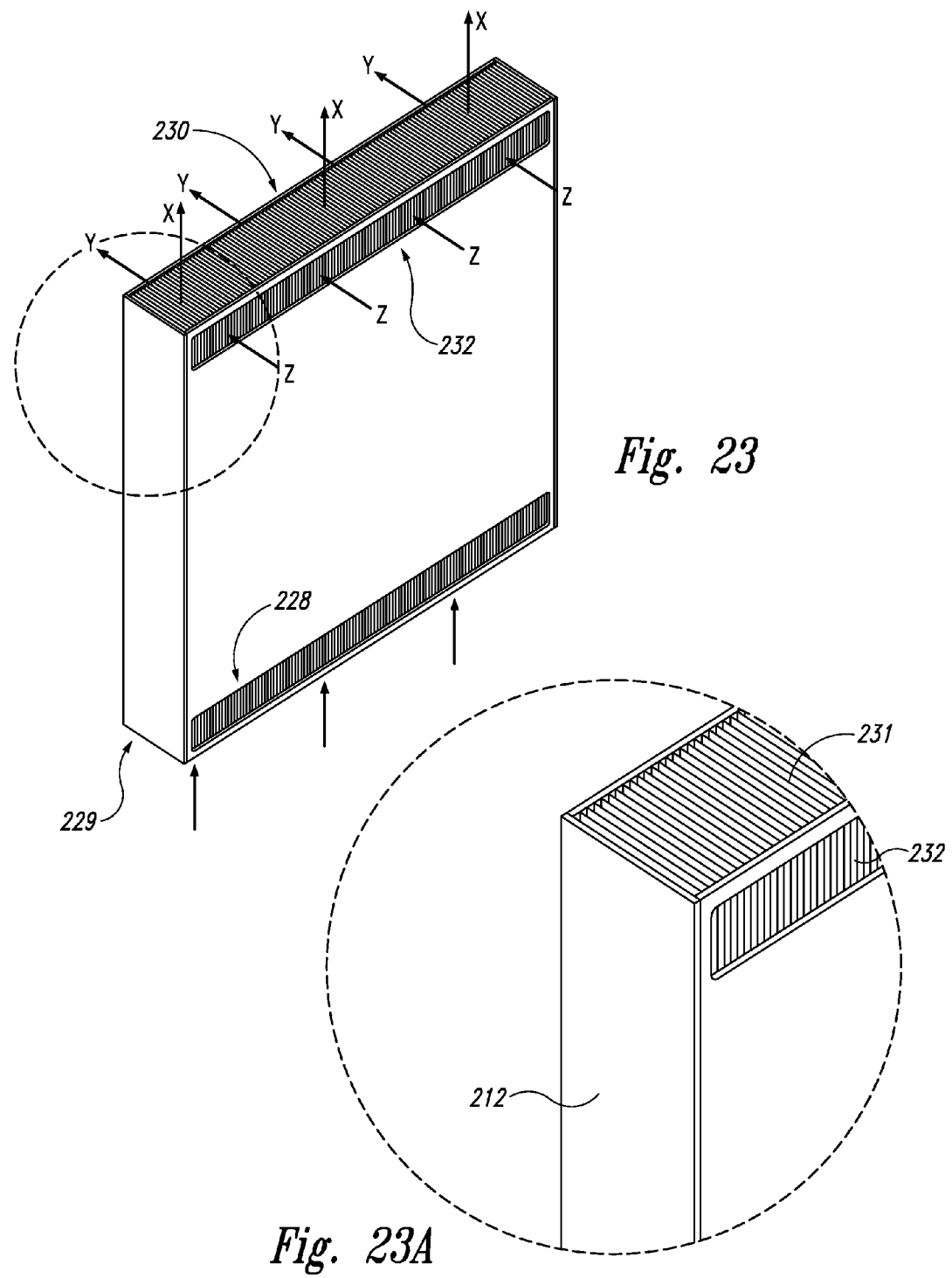
FIG. 23 is a perspective view of a heat exchange system according to the embodiment of FIG. 17.
FIG. 23A is an enlarged view of a portion of FIG. 23.

The heat exchange system that provides for increased efficiency of the device is seen in FIG. 23. The device pre-cools the incoming air flow moving in direction Y with the outgoing waste air flow X. This heat exchanger 212 is able to bypass the heat exchange system through upper front vent 232 should it be beneficial for the device given the current environmental conditions. In this embodiment, both incoming air flow Y and processed outgoing air flow X move upward through the device through separate vents respectively 228 and 229, such that air flows X and Y do not come in contact with each other.

The incoming air flow Y enters the device through air inlet 228 at the bottom of the front panel of heat exchanger 212. The processed air flow X that leaves evaporator 218 (which is cold dry air) enters heat exchanger 212 at its bottom through air inlet 229 and moves upward through exchanger 212 as is the new incoming air flow but in separate channels of the device. This incoming air flow that has passed through exchanger 212 then leaves exchanger 212 through outlet 230 at the top of the rear panel and enters into ducting that allows the air flow to move to evaporator 218. The outgoing air flow that is to leave the system leaves from top vent 231 of exchanger 212. Fan 226, as seen in FIG. 24, draws air through the device. Vent 217 allows outgoing processed air flow to exit the device.

As seen in FIG. 25, once the air has passed through an air intake filter, it is channeled to either intake 228 that draws the air flow Y through heat exchanger 212, or through intake 232 whereby air flow Z will bypass exchanger 212. Any number of means can be used to open one of inlets 228, 232 while closing the other, for example, a sliding door that is as wide as the distance between the inlets 228, 232 as well as long enough to cover one of the two inlets could be used. When it is desirable for air to pass through exchanger 212, the door will slide to close the intake 232 and open intake 228. When it is desirable for the incoming air flow to bypass heat exchanger 212, the door would then slide downward to cover intake 228 and opening intake 232. In addition, it may be desirable for the door to be only partially open such that some of the incoming air flow bypasses exchanger 212 while some air passes through it. The control system will determine the optimal position for the door of this embodiment. Alternatively, the device may incorporate a horizontally sliding door with overlapable vanes covering intakes 228 and 232 wherein intake 228 would close as the intake 232 would open. This could be controlled with a bimetal strip utilizing air temperature to mechanically move the door.

Once the incoming air has passed through exchanger 212 it is drawn across the top of evaporator 218 to the back of the device, after which the air flow travels down the first channel 219 of the evaporator 218 section. Water is collected in the water collection tray and air flow channel 227 and then the air flow moves upwardly through the unobstructed middle section 220 of evaporator 218 prior to being channeled downwardly again into the second finned evaporator channel 221 of evaporator 218 where again water is collected in the water collection tray 227.

Once the air flow has left evaporator 218 it is cool and dry and will enter bottom 229 of heat exchanger 212 where the air flow is used to pre-cool the incoming air flow. That processed air flow exits heat exchanger 212 at the top portion thereof as air flow stream X. The air flow is then ducted through fan 226 and expelled from the device.

In one embodiment of the invention, various parts and components of the device may be either constructed with Titanium Dioxide or be coated with Titanium Dioxide. Using this material to construct various parts for the device, or using this material as a coating on such parts, will ensure that these components are kept clean and free of contaminates and that the water source created by the device is kept free of unwanted contaminates. Most of the internal components of the device may be made of this inexpensive and abundant material. In addition, either all of the material that composes the storage container or the inner lining thereof may be made of Titanium Dioxide as a means to ensure that that the water source is kept clean and free of unwanted contaminates.

Titanium Dioxide (also known as Titania) may be used as an antimicrobial coating as the photo catalytic activity of Titania results in a thin coating of the material exhibiting self cleaning and disinfecting properties under exposure to ultra-violet (UV) radiation. These properties make the material useful in the construction of the water condensation system by helping to keep air and water sources clean and free of contaminates while as well offering the benefits of self repair should a surface be scratched or compromised. Titanium dioxide is the naturally occurring oxide of titanium, chemical formula $TiO2$. Approved by the food testing laboratory of the United States Food and Drug Administration (FDA), Titanium Dioxide is considered a safe substance and harmless to humans.

Scientific studies on photo catalysis have proven this unique but abundant substance to be antibacterial, anti-viral and fungicidal making it ideal for self cleaning surfaces and may be used for deodorizing, air purification, water treatment, and water purification.

As Titanium dioxide is a semiconductor and is chemically activated by light energy, appropriate lighting sources may be added at various strategic points throughout the device to ensure that the air and water sources are kept clean and free of unwanted substances. Some of the most beneficial places throughout the system that might use this TiO2 exposed to UV radiation are the heat exchanger, evaporator plates, and the storage container, however virtually all surfaces that come in contact with either the air or the water source may be constructed with Titanium Dioxide. One strategic place for the lighting source might be between the heat exchanger and the evaporator plates using reflective material to ensure that the light radiates through both theses sections of the device made of, or coated with, Ti 02.

As a pure titanium dioxide coating is relatively clear, this substance may be used for the inner lining of tubing that carries the water from the evaporator plates to the storage container and may become part of the UV purification system. This material has an extremely high index of refraction with an optical dispersion higher than diamond so in order to enhance its desired effects, coiled tubing that surrounds the light source, may be encased in a reflective material so as to ensure that light is given an adequate opportunity to come in contact with the surface of the material and thus create the desired effect.

In applications where this UV and Titanium Dioxide purification system is used inside of a storage container of some sort, an opening may be situated at the bottom of the reflective encasement such that light will escape to offer these same desire effects to occur within the storage container. Alternatively, a separate light may be used within the storage container assuming it is not practical for various applications to use only one light to serve this purpose. Other materials may be used also having desirable attributes within the device. These may include hydrophobic coatings (water repelling), and a variety of antimicrobial elements proven to suppress the growth and migration of bacteria. These substances may include silver or other compounds known to reduce bacterial growth as well as a variety of corrosion proofing materials.

In a preferred embodiment the device can be cleaned by capping the collection plate, filling the evaporator and heat exchanger (which are watertight) with an appropriate disinfecting solution (such as chlorine), and allowing the device to sit in this state for a period of time prior to draining.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

The invention claimed is:

1. A water condenser comprising:
a housing having a first air intake for entry of a first air flow, said first air intake mounted to an air-to-air heat exchanger having a pre-refrigeration set of air conduits cooperating in fluid communication with said first air intake; for intake of said first air flow into said pre-refrigeration set of air conduits, said heat exchanger having a post-refrigeration set of air conduits arranged relative to the pre-refrigeration set of air conduits for heat transfer between said pre-refrigeration set of air conduits and said post-refrigeration set of air conduits,
a refrigeration unit cooperating with said pre-refrigeration set of air conduits for passage of said first air flow from a downstream end of the pre-refrigeration set of air conduits into an upstream end of said refrigeration unit, wherein said refrigeration unit includes refrigerated surfaces over which said first air flow passes as it flows from said upstream end of the refrigeration unit to a downstream end of said refrigeration unit, said first air flow cooled in said refrigeration unit below a dew point of said first air flow so as to condense moisture from said first air flow onto said refrigerated surfaces for gravity-assisted collection of the first moisture into a moisture collector mounted under said refrigeration unit,
an air-to-water heat exchanger cooperating with said air-to-air heat exchanger for cooling said first air flow wherein said first air flow is passed through said air-to-water heat exchanger and said first moisture from said moisture collector is simultaneously passed through said air-to-water heat exchanger so that said first moisture, cools said first air flow, said downstream end of said refrigeration unit cooperating with, for passage of said first air flow into, an upstream end of said post-refrigeration set of air conduits, said first air flow exhausting from a downstream end of said post-refrigeration set of air conduits, wherein said first air flow in said post-refrigeration set of air conduits pre-cools said first air flow in said pre-refrigeration set of air conduits,
control means for controlling the temperature of said first air flow in said pre-refrigeration set of air conduits so that it remains above a dew point temperature of said first air flow when in said pre-refrigeration set of air conduits and for controlling the temperature of said first air flow in said refrigeration unit so that it drops below a dew point temperature of said first air flow when in said refrigeration unit without freezing, an air flow mover urging said first air flow into said first air intake, along said pre-refrigeration set of air conduits, through said refrigeration unit, and along said post-refrigeration set of air conduits.

2. The device of claim 1 further comprising an air plenum having upstream and downstream ends, said upstream end of said air plenum cooperating with said downstream end of said post-refrigeration set of air conduits so that said first air flow flows into said air plenum at said upstream end of said plenum, said plenum having an auxiliary air intake into said plenum, for intake of an ambient second air flow into said plenum, said downstream end of said plenum cooperating in fluid communication with a refrigerant condenser in a refrigeration circuit including said first and second air flows exhausting from a downstream end of said refrigerant condenser, wherein said air flow mover urges said first and second air flows through said plenum and said refrigerant condenser.

3. The device of claim 2 further comprising a selectively actuable air flow metering valve mounted in cooperation with said auxiliary air intake for selectively controlling the volume and flow rate of said second air flow passing into said plenum.

4. The device of claim 3 further comprising an automated actuator cooperating with said metering valve for automated actuation of said metering valve between open and closed positions of said valve according to at least one environmental condition indicative of moisture content in said first air flow.

5. The device of claim 4 wherein said automated actuator is a bi-metal actuator and wherein said at least one environmental condition includes ambient air temperature external to said housing.

6. The device of claim 4 wherein said automated actuator includes a processor cooperating with at least one sensor, said at least one sensor for sensing said at least one environmental condition and communicating environmental data corresponding to said at least one environmental condition from said at least one sensor to said processor.

7. The device of claim 2 where, in upstream-to-downstream order, said refrigeration unit is adjacent to said heat exchanger, said heat exchanger is adjacent to said plenum, said plenum is adjacent to said refrigerant condenser, and said refrigerant condenser is adjacent to said air flow mover.

8. The device of claim 7 wherein said refrigeration unit, said heat exchanger, said plenum, said refrigerant condenser, and said air flow mover are interleaved in closely adjacent array.

9. The device of claim 2 wherein said first air flow has a corresponding first mass flow rate, and wherein said second air flow has a corresponding second mass flow rate, and wherein a combined air flow of said first and second air flows is the sum of corresponding first and second mass flow rates so that a combined mass flow rate of said combined air flow is greater than said first mass flow rate.

10. The device of claim 1 wherein said refrigeration unit is a refrigerant evaporator.

11. The device of claim 10 further comprising a processor cooperating with at least one sensor, said at least one sensor for sensing said at least one environmental condition and communicating environmental data corresponding to said at least one environmental condition from said at least one sensor to said processor, wherein at least one environmental condition of said at least one environmental condition is chosen from the group consisting of: ambient air temperature, first air flow temperature of said first air flow, humidity, barometric air pressure, air density, air flow velocity, air mass flow rate, temperature of said refrigerated surface.

12. The device of claim 11 wherein said at least one sensor senses said at least one environmental condition in or in proximity to said first air flow.

13. The device of claim 12 wherein said first air flow temperature environmental condition includes air temperatures in said pre-refrigeration and post-refrigeration sets of air conduits.

14. The device of claim 12 wherein said first air flow temperature environmental condition includes air temperature in said refrigeration unit.

15. The device of claim 14 wherein said at least one sensor senses said at least one environmental condition in said heat exchanger, and wherein said processor regulates said first air flow in said first refrigeration unit so that said air temperature in said refrigeration unit is below said dew point of said first air flow, but above freezing.

16. The device of claim 14 wherein said processor calculates said dew point for said first air flow based on said at least one environmental condition sensed by said at least one sensor.

17. The device of claim 14 wherein said air flow mover is selectively controllable and wherein said processor regulates said first air flow so as to minimize said air temperature of said first air flow from dropping below said dew point for said first air flow while in said heat exchanger to minimize condensation within said heat exchanger.

18. The device of claim 12 wherein said air flow mover is at least one fan in a flow path containing said first air flow.

19. The device of claim 18 wherein said at least one fan includes a fan downstream of said heat exchanger.

20. The device of claim 18 further comprising at least one air filter in said flow path.

21. The device of claim 20 further comprising a water filter for filtering water harvested from said refrigeration unit.

22. The device of claim 20 wherein said at least one air filter includes an ultra-violet radiation lamp mounted in proximity to so as to cooperate with said flow path.

23. The device of claim 20 wherein said water filter includes an ultra-violet radiation lamp mounted in proximity to so as to cooperate with said moisture collector.

24. The device of claim 20 wherein said at least one air filter and said water filter include a common ultra-violet radiation lamp mounted in proximity to so as to cooperate with said flow path and said moisture collector.

25. The device of claim 1 wherein said refrigeration unit includes a plate condenser having at least one plate.

26. The device of claim 25 wherein said at least one plate is a plurality of plates.

27. The device of claim 26 wherein said plurality of plates are mounted in substantially parallel spaced apart array.

28. The device of claim 1 wherein said air-to-water heat exchanger is upstream of said air-to-air heat exchanger along said first air flow.

29. The device of claim 1 wherein said air-water heat exchanger is downstream of said air-to-air heat exchanger along said first air flow.

30. The device of claim 1, wherein said housing, said first air intake, said air-to-air heat exchanger, said sets of air conduits, said refrigeration unit, said moisture collector, said air-to-water heat exchanger, moisture conduits, or said air flow mover include titanium dioxide as a constituent component, and said device further comprising at least one source of radiation mounted within said housing so as to irradiate internal surfaces of at least one of said housing, said first air intake, said air-to-air heat exchanger, said sets of air conduits, said refrigeration unit, said moisture collector, said air-to-water heat exchanger, moisture conduits or said air flow mover, and wherein said source of radiation is mounted between said heat exchanger and said evaporator.

31. The device of claim 30 further comprising a reflector mounted adjacent to said source of radiation to reflect radiation onto internal surfaces of said heat exchanger and said evaporator.

* * * * *